United States Patent
Wu et al.

(10) Patent No.: US 12,014,720 B2
(45) Date of Patent: Jun. 18, 2024

(54) VOICE SYNTHESIS METHOD, MODEL TRAINING METHOD, DEVICE AND COMPUTER DEVICE

(71) Applicant: Tencent Technology (Shenzhen) Company Limited, Shenzhen (CN)

(72) Inventors: Xixin Wu, Shenzhen (CN); Mu Wang, Shenzhen (CN); Shiyin Kang, Shenzhen (CN); Dan Su, Shenzhen (CN); Dong Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 891 days.

(21) Appl. No.: 16/999,989

(22) Filed: Aug. 21, 2020

(65) Prior Publication Data

US 2020/0380949 A1 Dec. 3, 2020

Related U.S. Application Data

(63) Continuation of application No. PCT/CN2019/090493, filed on Jun. 10, 2019.

(30) Foreign Application Priority Data

Jul. 25, 2018 (CN) .......................... 201810828220.1

(51) Int. Cl.
*G10L 13/00* (2006.01)
*G10L 19/02* (2013.01)

(52) U.S. Cl.
CPC .............. *G10L 13/00* (2013.01); *G10L 19/02* (2013.01)

(58) Field of Classification Search
CPC ......... G10L 13/00; G10L 19/02; G10L 13/04; G10L 13/033; G10L 13/047; G10L 19/04;
(Continued)

(56) References Cited

U.S. PATENT DOCUMENTS

| 6,098,041 | A | * | 8/2000 | Matsumoto | ............. | G10L 13/02 |
| | | | | | | 704/260 |
| 10,079,011 | B2 | * | 9/2018 | Conkie | .................... | G10L 13/07 |
| 10,540,956 | B2 | * | 1/2020 | Ohtani | .................... | G10L 13/04 |
| 2004/0049382 | A1 | * | 3/2004 | Yamaura | ................. | G10L 19/12 |
| | | | | | | 704/226 |

(Continued)

FOREIGN PATENT DOCUMENTS

| CN | 103680491 A | 3/2014 |
| CN | 105529023 A | 4/2016 |

(Continued)

OTHER PUBLICATIONS

Tencent Technology, ISR, PCT/CN2019/090493, Aug. 30, 2019, 2 pgs.

(Continued)

*Primary Examiner* — Abdelali Serrou
(74) *Attorney, Agent, or Firm* — Morgan, Lewis & Bockius LLP

(57) ABSTRACT

This application relates to a speech synthesis method and apparatus, a model training method and apparatus, and a computer device. The method includes: obtaining to-be-processed linguistic data; encoding the linguistic data, to obtain encoded linguistic data; obtaining an embedded vector for speech feature conversion, the embedded vector being generated according to a residual between synthesized reference speech data and reference speech data that correspond to the same reference linguistic data; and decoding the encoded linguistic data according to the embedded vector, to obtain target synthesized speech data on which the speech feature conversion is performed. The solution provided in this application can prevent quality of a synthesized speech from being affected by a semantic feature in a mel-frequency cepstrum.

18 Claims, 12 Drawing Sheets

(58) Field of Classification Search
CPC . G10L 19/16; G10L 19/12; G10L 2019/0002; G10L 19/09; G10L 19/18; G10L 19/0204; G10L 19/20; G10L 2019/0016; G10L 25/90; G10L 25/06; G10L 2019/0014; G10L 25/18; G10L 2019/0005; G10L 19/22; G10L 19/24; G10L 2019/0013; G10L 2021/02082
See application file for complete search history.

(56) References Cited

U.S. PATENT DOCUMENTS

| | | | |
|---|---|---|---|
| 2008/0177546 A1 | 7/2008 | Deng et al. | |
| 2014/0222421 A1 | 8/2014 | Chen et al. | |
| 2016/0111108 A1* | 4/2016 | Erdogan | G10L 21/0324 704/226 |
| 2017/0076715 A1* | 3/2017 | Ohtani | G10L 13/04 |
| 2017/0092258 A1* | 3/2017 | Edrenkin | G10L 13/08 |
| 2018/0268806 A1* | 9/2018 | Chun | G10L 13/027 |
| 2018/0268807 A1* | 9/2018 | Agiomyrgiannakis | G10L 13/07 |
| 2020/0159997 A1* | 5/2020 | Wu | G06F 40/20 |

FOREIGN PATENT DOCUMENTS

| | | |
|---|---|---|
| CN | 106157948 A | 11/2016 |
| CN | 106898345 A | 6/2017 |
| CN | 108091321 A | 5/2018 |
| CN | 109036375 A | 12/2018 |

OTHER PUBLICATIONS

Extended European Search Report, EP19840536.7, Apr. 21, 2021, 12 pgs.
Xixin Wu et al., "Rapid Style Adaptation Using Residual Error Embedding for Expressive Speech Synthesis", Interspeech 2018, ISCA, Sep. 2, 2018, 5 pgs.
Mu Wang et al., "Emphatic Speech Synthesis and Control Based on Characteristic Transferring in End-to-End Speech Synthesis", 2018 First Asian Conference on Affective Computing and Intelligent Interaction (ACII ASIA), IEEE, May 20, 2018, 3 pgs.
Ye Jia et al., "Transfer Learning from Speaker Verification to Multispeaker Text-To-Speech Synthesis", Arxiv.org, Cornell University Library, Ithaca, NY 14853, Jun. 12, 2018, 15 pgs.
Yuxuan Wang et al., "Style Tokens: Unsupervised Style Modeling, Control and Transfer in End-to-End Speech Synthesis", Arxiv.org, Cornell University Library, Ithaca, NY 14853, Mar. 24, 2018, 2 pgs.
Tencent Technology, WO, PCT/CN2019/090493, Aug. 30, 2019, 5 pgs.
Tencent Technology, IPRP, PCT/CN2019/090493, Jan. 26, 2021, 6 pgs.
Tencent Technology, European Office Action, EP Patent Application No. 19840536.7, dated Feb. 3, 2023, 5 pgs.

* cited by examiner

VOICE SYNTHESIS METHOD, MODEL TRAINING METHOD, DEVICE AND COMPUTER DEVICE

CROSS REFERENCE TO RELATED APPLICATIONS

This application is a continuation application of PCT Patent Application No. PCT/CN2019/090493, entitled "VOICE SYNTHESIS METHOD, MODEL TRAINING METHOD, DEVICE AND COMPUTER DEVICE" filed on Jun. 10, 2019, which claims priority to Chinese Patent Application No. 201810828220.1, entitled "SPEECH SYNTHESIS METHOD AND APPARATUS, MODEL TRAINING METHOD AND APPARATUS, AND COMPUTER DEVICE" filed on Jul. 25, 2018, all of which are incorporated by reference in their entirety.

FIELD OF THE TECHNOLOGY

This application relates to the field of speech synthesis technologies, and in particular, to a speech synthesis method and apparatus, a model training method and apparatus, and a computer device.

BACKGROUND OF THE DISCLOSURE

With continuous development of speech synthesis technologies and computer technologies, application scenarios of speech interaction become increasingly extensive. A user can conveniently obtain various speech-related services by using digital products. For example, a user uses an electronic map in a mobile phone for voice navigation, listens to an audiobook by using reading software, and the like.

If a synthesized speech has a human speech feature, user experience is undoubtedly improved. To make the synthesized speech have a speech feature of a person, a general solution is to use a mel-frequency cepstrum obtained through speech data processing as an input variable of a feature model to obtain a speech feature of a speaker; and then an end-to-end model (Tacotron) is used to synthesize speech data according to the obtained speech feature and a corresponding text feature, so that the synthesized speech data has the speech feature of the speaker. However, in the foregoing solution, because the mel-frequency cepstrum includes both the speech feature and a semantic feature of the speaker, extraction of the speech feature from the met-frequency cepstrum is affected, and a quality of the synthesized speech is further affected.

SUMMARY

This application provides a speech synthesis method and apparatus, a model training method and apparatus, and a computer device.

A speech synthesis method is performed at a computer device having one or more processors and memory storing one or more programs to be executed by the one or more processors, the method comprising:
  obtaining to-be-processed linguistic data; encoding the linguistic data, to obtain encoded linguistic data; obtaining an embedded vector for speech feature conversion, the embedded vector being generated according to a residual between reference speech data synthesized from reference linguistic data and target reference speech data that correspond to the same reference linguistic data; and decoding the encoded linguistic data by performing the speech feature conversion on the encoded linguistic data according to the embedded vector, to obtain target synthesized speech data.

A non-transitory computer readable storage medium is provided, storing a plurality of computer programs, the computer programs, when executed by a processor of a computer device, causing the computer device to perform the operations of the speech synthesis method.

A computer device is provided, including a memory and a processor, the memory storing a plurality of computer programs, the computer programs, when executed by the processor, causing the computer device to perform the operations of the speech synthesis method.

In the foregoing speech synthesis method and apparatus, storage medium, and computer device, the to-be-processed linguistic data is obtained, and the linguistic data is encoded, so that the encoded linguistic data representing pronunciation can be obtained. The embedded vector for speech feature conversion is obtained. Because the embedded vector is generated according to the residual between the synthesized reference speech data and the reference speech data that correspond to the same reference linguistic data, the obtained embedded vector is a style feature vector that does not include a semantic feature. The encoded linguistic data is decoded according to the embedded vector, avoiding impact of the semantic feature on processing of the encoded linguistic data. Therefore, the obtained target synthesized speech data has high quality, thereby improving quality of the synthesized speech.

A model training method is provided, including:
  obtaining training linguistic data and corresponding training speech data; encoding the training linguistic data by using a first encoder, to obtain first encoded training linguistic data; obtaining a training embedded vector for speech feature conversion, the training embedded vector being generated according to a residual between synthesized training speech data and training speech data that correspond to the same training linguistic data; decoding the first encoded training linguistic data according to the training embedded vector by using a first decoder, to obtain predicted target synthesized speech data on which the speech feature conversion is performed; and adjusting the first encoder and the first decoder according to a difference between the predicted target synthesized speech data and the training speech data, and continuing to perform training until a training stop condition is satisfied.

A non-transitory computer readable storage medium is provided, storing a plurality of computer programs, the computer programs, when executed by a processor of a computer device, causing the computer device to perform the operations of the model training method.

A computer device is provided, including a memory and a processor, the memory storing a plurality of computer programs, the computer programs, when executed by the processor, causing the computer device to perform the operations of the model training method.

In the foregoing model training method and apparatus, storage medium, and computer device, the training linguistic data, the training speech data, and the training embedded vector are processed by using the first encoder and the first decoder, to obtain the predicted target synthesized speech data. The first encoder and the first decoder are adjusted according to the difference between the predicted target synthesized speech data and the training speech data, to make the predicted target synthesized speech data continuously approximate to the training speech data, thereby obtaining the trained first encoder and first decoder. The training embedded vector generated according to the residual between the synthesized training speech data and the training speech data is used in the training process, and the training embedded vector includes only a speech feature, so that impact of a semantic feature on a training model does not need to be considered, thereby reducing complexity of the first encoder and the first decoder, and improving accuracy of a training result.

DESCRIPTION OF EMBODIMENTS

To make the objectives, technical solutions, and advantages of this application clearer and more comprehensible, the following further describes this application in detail with reference to the accompanying drawings and embodiments. It is to be understood that the specific embodiments described herein are merely used for explaining this application but are not intended to limit this application.

Figure 1:
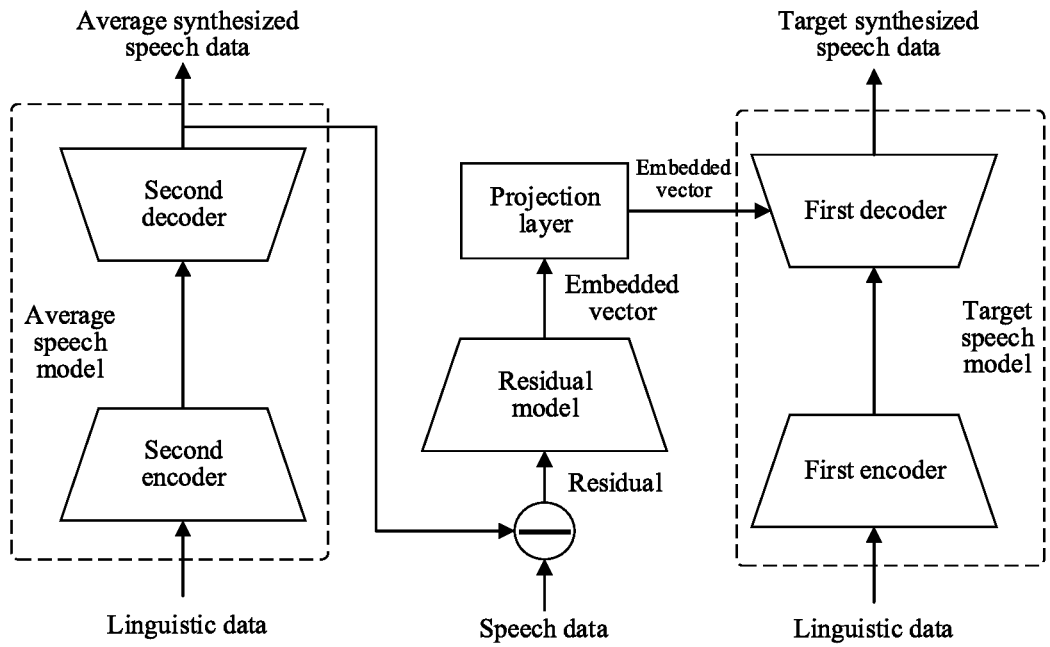
FIG. 1 is a structural diagram of an application system of a speech synthesis method and a model training method according to an embodiment.

FIG. 1 is a diagram of an application environment of a speech synthesis method and a model training method according to an embodiment. Referring to FIG. 1, the speech synthesis method and the model training method are applied to a speech synthesis system. The speech synthesis system includes a first encoder, a first decoder, a second encoder, a second decoder, a superimposer, a residual model, and a projection layer. An internal relationship between components and a signal flow in the speech synthesis system are shown in FIG. 1. The first encoder and the first decoder constitute a target speech model configured to synthesize a speech in an application phase. The second encoder and the second decoder constitute an average speech model. The constituted average speech model, the superimposer, the residual model, and the projection layer are combined, and may be configured in an adaptive phase to obtain an embedded vector used for representing a style feature. The speech synthesis system may be run on a computer device in a form of an application program or a component of an application program. The computer device may be a terminal or a server. The terminal may be a desktop terminal, a mobile terminal, or an intelligent robot. The mobile terminal may be a smartphone, a tablet computer, a notebook computer, a wearable device, or the like.

Figure 2:
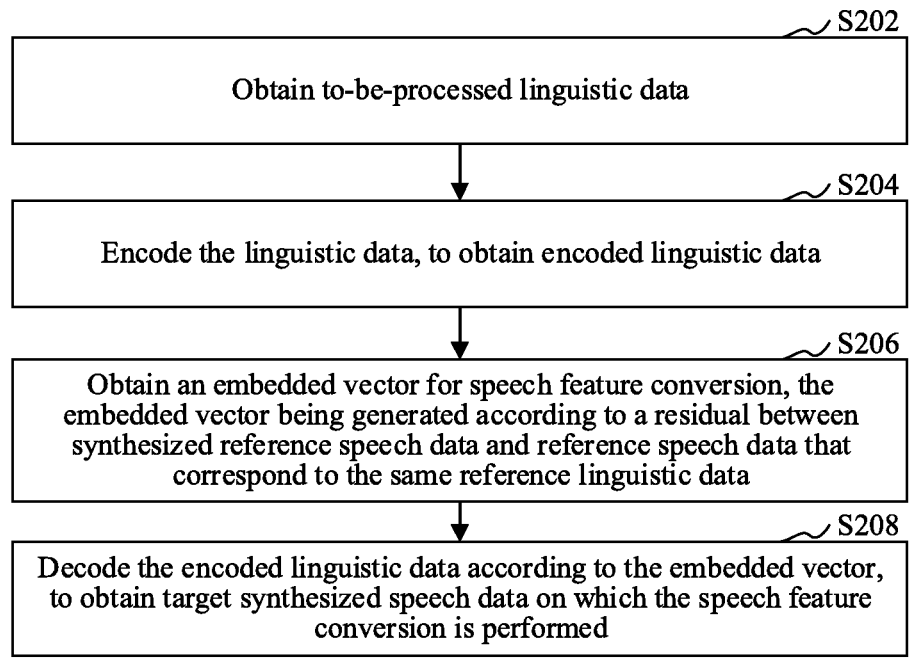
FIG. 2 is a schematic flowchart of a speech synthesis method according to an embodiment.

As shown in FIG. 2, in an embodiment, a speech synthesis method is provided. This embodiment is mainly described by using an example in which the method is applied to the terminal on which the speech synthesis system is run in FIG. 1. Referring to FIG. 2, the speech synthesis method may include the following steps:

S202: Obtain to-be-processed linguistic data.

The linguistic data may be text, a text feature, or a feature item. The text feature may be a feature such as a character, a pronunciation, or a rhythm and a stress of a character or a word in text. The feature item may be a character, a word, a phrase, or the like. The feature item needs to have the following properties: being capable of accurately identifying text content, being capable of distinguishing target text from other text, and being easily separated.

In an embodiment, in an application process, the terminal receives a speech interaction signal sent by a user, and searches a preset linguistic library for linguistic data corresponding to the speech interaction signal. For example, in a process of speech interaction between the user and the terminal, if the terminal receives a speech interaction signal of "Who is more beautiful, Xi Shi or Diao Chan" sent by the user (Xi Shi and Diao Chan are two of the renowned Four Beauties of ancient China), the terminal searches the preset linguistic library for linguistic data of "Xi Shi is as beautiful as Diao Chan" that corresponds to the speech interaction signal. In this example, the linguistic data is text.

S204: Encode the linguistic data, to obtain encoded linguistic data.

In an embodiment, the terminal encodes the linguistic data by using the first encoder, to obtain the encoded linguistic data. For example, the terminal obtains a piece of text, and encodes the text by using the first encoder, to obtain a distributed representation. The distributed representation is encoded linguistic data. The distributed representation may be an eigenvector. One eigenvector corresponds to one character or word in the text.

The first encoder may be a linguistic data encoder or an attention-based recursive generator. The first encoder may include a recurrent neural network (RNN), a long short-term memory (LSTM), a gated convolutional neural network (CNN), or a time delay network.

For example, the terminal inputs a vector representing linguistic data into the first encoder, and uses the last cell state of the first encoder as an output, to obtain encoded linguistic data.

S206: Obtain an embedded vector for speech feature conversion, the embedded vector being generated according to a residual between reference speech data synthesized from reference linguistic data and target reference speech data that correspond to the same reference linguistic data.

The embedded vector may be a vector having a speaking style feature of a reference object, and the reference object may be a person with a special speaking style. The style feature includes, but is not limited to: a rhyme duration feature highly correlated with duration and a rhyme fluctuation, a fundamental frequency feature, and an energy feature. The rhyme duration feature includes features such as duration, a pause, and a stress of one character or word. The terminal combines and processes the embedded vector and the corresponding encoded linguistic data, to obtain synthesized speech data having the speaking style of the reference object. When the synthesized speech data is played through a speaker after being processed, the played synthesized speech is no longer a mechanical speech, but a speech with a human speaking style.

In an embodiment, before speech interaction between a user and the terminal, the terminal obtains reference linguistic data and reference speech data that has a style feature. A source of the reference speech data may be a user performing speech interaction with the terminal, or may be a specified reference user. The terminal performs speech synthesis on the reference linguistic data, to obtain synthesized reference speech data having no style feature. The terminal calculates a difference between the synthesized reference speech data and the reference speech data, to obtain a residual representing the style feature. The terminal processes the residual to obtain an embedded vector representing the style feature. The terminal stores the obtained embedded vector into a style feature vector library. The style feature vector library may store embedded vectors corresponding to a plurality of reference objects. The residual representing the style feature may be essentially a residual sequence.

In an embodiment, the step of processing, by the terminal, the residual to obtain an embedded vector representing a style feature may include: inputting the residual into a plurality of dense layers of the residual model; separately inputting results outputted by the dense layers into a forward gated recurrent unit (GRU) layer and a backward GRU layer; and adding an output of the last time step of the forward GRU layer and an output of the first time step of the backward GRU layer, to obtain the embedded vector used for speech feature conversion and capable of representing the style feature.

For example, if the user intends to hear a speaking style of Maggie Cheung, a renowned Hong Kong actress, when performing speech interaction with the terminal, before the user performs speech interaction with the terminal, the terminal obtains speech data of Maggie Cheung as reference speech data, and obtains corresponding linguistic data (for example, spoken text content, where the text content is, for example, "Who is more beautiful, Xi Shi or Diao Chan"). The obtained reference speech data has the speaking style of Maggie Cheung. The terminal performs speech synthesis on the linguistic data, to obtain synthesized reference speech data having no speaking style of Maggie Cheung. The terminal calculates a difference between the reference speech data having the speaking style of Maggie Cheung and the synthesized reference speech data having no speaking style, to obtain a residual representing a style feature. The terminal processes the obtained residual, to obtain an embedded vector capable of representing the speaking style of Maggie Cheung.

In an embodiment, the terminal stores the obtained embedded vector used for speech feature conversion and capable of representing the style feature into an embedded vector library. When receiving a style feature selection instruction, the terminal displays a style selection interface corresponding to the embedded vector.

In an embodiment, the terminal receives a specified style feature instruction, and obtains an embedded vector corresponding to the style feature instruction from the style feature vector library. For example, if a user intends to hear the voice of a movie/sports star, the user selects a target movie/sports star from reference objects in the style selection interface of the terminal. In this case, the terminal receives a style feature instruction for the movie/sports star, and selects, according to the style feature instruction, an embedded vector representing a speaking style of the movie/sports star.

S208: Decode the encoded linguistic data by performing the speech feature conversion on the encoded linguistic data according to the embedded vector, to obtain target synthesized speech data.

In an embodiment, the terminal decodes the encoded linguistic data according to the embedded vector by using the first decoder, to obtain the target synthesized speech data on which the speech feature conversion is performed and that has the speaking style of the reference object. Alternatively, the terminal combines the embedded vector and the encoded linguistic data, and decodes a result obtained through the combination, to obtain the target synthesized speech data on which the speech feature conversion is performed and that has the speaking style of the reference object.

The first decoder may be a speech data decoder or an attention-based recursive generator. The first decoder may include an RNN, an LSTM, a CNN, a gated CNN, or a time delay network.

Figure 3:
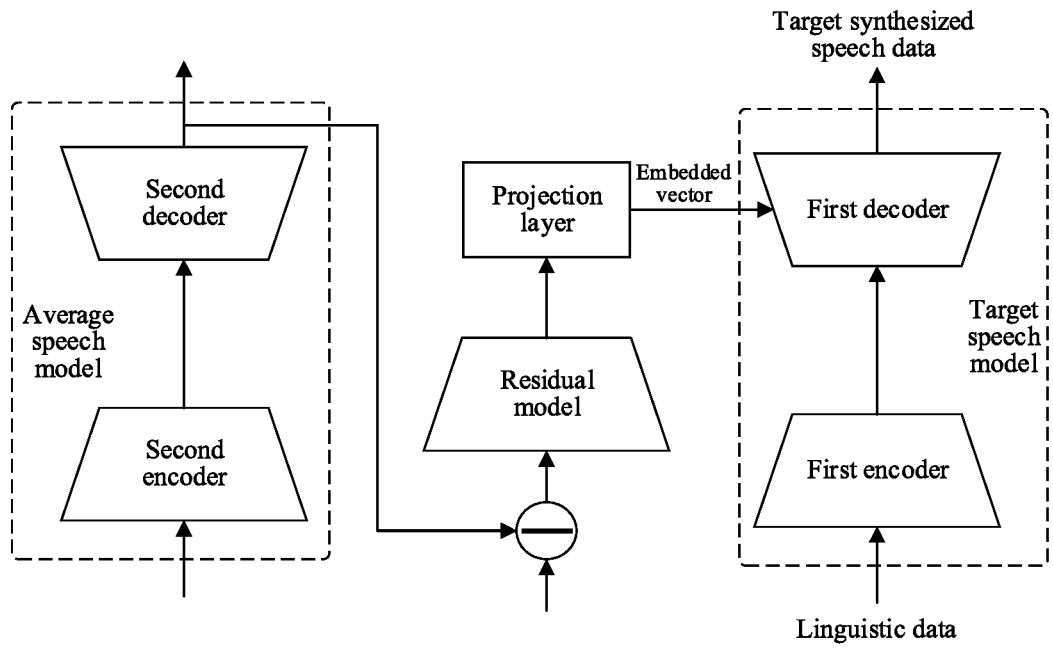
FIG. 3 is a schematic diagram of obtaining target synthesized speech data in a speech synthesis phase according to an embodiment.

In an example, as shown in FIG. 3, when receiving a speech interaction signal sent by the user, the terminal obtains linguistic data corresponding to the speech interaction signal. The linguistic data is, for example, "Who is more beautiful, Xi Shi or Diao Chan". The terminal inputs the obtained linguistic data into the first encoder, and obtains encoded linguistic data through encoding processing by the first encoder. The terminal obtains an embedded vector capable of representing a speaking style of a reference object (for example, Maggie Cheung), and processes the embedded vector and the encoded linguistic data by using the first decoder, to obtain target synthesized speech data having the speaking style of the reference object.

In the foregoing embodiment, the to-be-processed linguistic data is obtained, and the linguistic data is encoded, so that the encoded linguistic data representing pronunciation can be obtained. The embedded vector for speech feature conversion is obtained. Because the embedded vector is generated according to the residual between the synthesized reference speech data and the reference speech data that correspond to the same reference linguistic data, the obtained embedded vector is a style feature vector that does not include a semantic feature. The encoded linguistic data is decoded according to the embedded vector, avoiding impact of the semantic feature on processing of the encoded linguistic data. Therefore, the obtained target synthesized speech data has quality, thereby improving quality of the synthesized speech.

Figure 4:
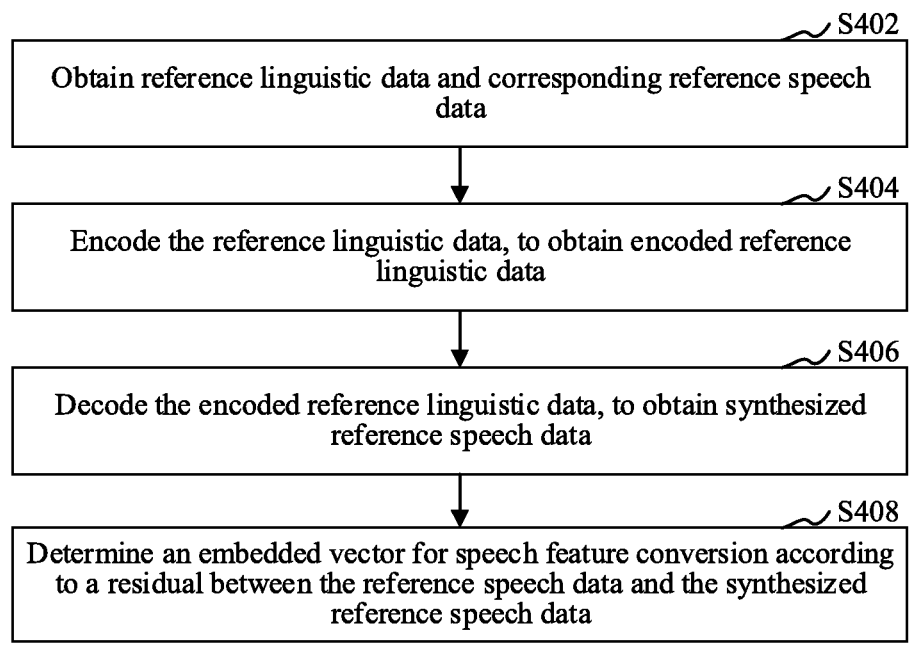
FIG. 4 is a schematic flowchart of steps of obtaining an embedded vector according to reference linguistic data and reference speech data according to an embodiment.

In an embodiment, as shown in FIG. 4, the method may further include:

S402: Obtain reference linguistic data and corresponding reference speech data.

The reference speech data may be speech data acquired from a reference object. The reference linguistic data corresponds to the reference speech data. The reference object may be a user performing speech interaction with the terminal, or may be a specified reference user. Correspondingly, the reference speech data may be a speech signal sent by the reference object, and the reference linguistic data may be text content to be expressed in the speech signal.

For example, if a user intends to hear a speaking style of the user when performing speech interaction with the terminal, before the user performs speech interaction with the terminal, speech data of the user is obtained as reference speech data, and corresponding linguistic data is obtained. The obtained reference speech data has the speaking style of the user. The terminal performs speech synthesis on the linguistic data, to obtain synthesized reference speech data having no speaking style of the user. The terminal calculates a difference between the reference speech data having the speaking style of the user and the synthesized reference speech data having no speaking style, to obtain a residual representing a style feature. The terminal processes the obtained residual, to obtain an embedded vector capable of representing the speaking style of the user.

In an embodiment, the terminal acquires a speech of the reference object, and performs framing, windowing, and Fourier transform on the acquired speech, to obtain speech data that has the speaking style feature of the reference object and that is in a frequency domain.

S404: Encode the reference linguistic data, to obtain encoded reference linguistic data.

In an embodiment, the terminal encodes the reference linguistic data by using the first encoder, to obtain the encoded reference linguistic data. For example, the terminal obtains a piece of text, and encodes the text by using the first encoder, to obtain a distributed representation. The distributed representation is encoded reference linguistic data. The distributed representation may be an eigenvector. One eigenvector corresponds to one character or word in the text.

The second encoder may be a linguistic data encoder or an attention-based recursive generator. The second encoder may include an RNN, an LSTM, a gated CNN, or a time delay network. For example, the terminal inputs a vector representing linguistic data into the second encoder, and uses the last cell state of the second encoder as an output, to obtain encoded linguistic data.

S406: Decode the encoded reference linguistic data, to obtain synthesized reference speech data.

In an embodiment, the terminal decodes the encoded reference linguistic data by using the second decoder, to obtain the synthesized reference speech data having no style feature.

The second decoder may be a speech data decoder or an attention-based recursive generator. The second decoder may include an RNN, an LSTM, a CNN, a gated CNN, or a time delay network.

Figure 5:
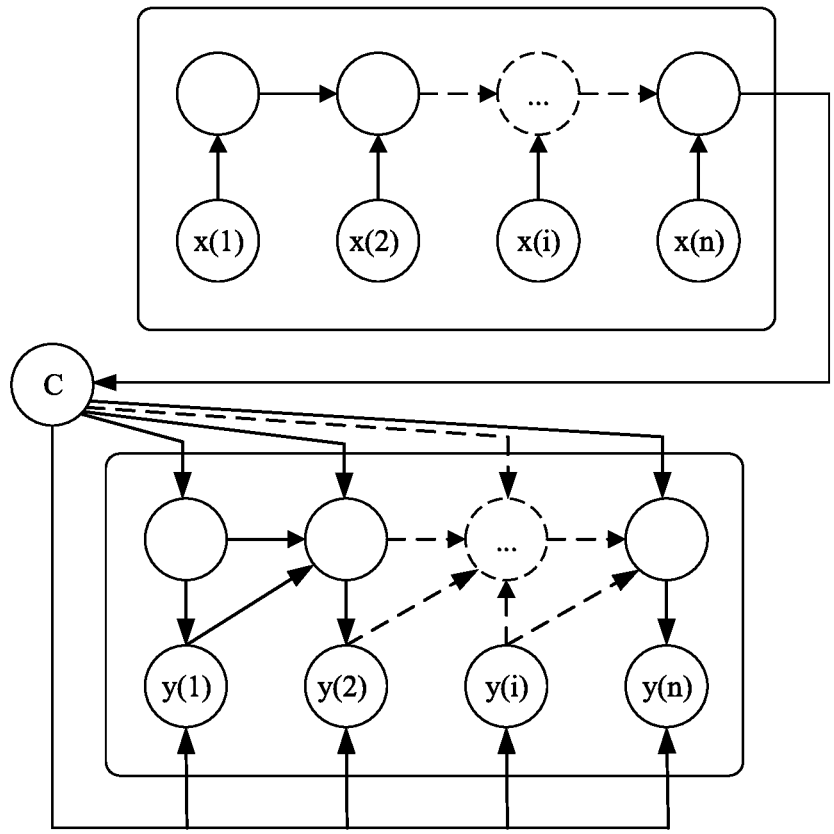
FIG. 5 is a schematic diagram of a data flow in a process of obtaining an embedded vector according to an embodiment.

S404 and S406 are steps of synthesizing the synthesized reference speech data having no style feature. As shown in FIG. 5, an example is provided. After obtaining reference linguistic data, the terminal inputs the obtained reference linguistic data into the second encoder, and processes the reference linguistic data by using the second encoder, to obtain a context representation C representing the reference linguistic data. The context representation C may be a vector summarizing an input sequence $X=\{x(1), x(2) \ldots x(n)\}$, where n is an integer greater than 1. The terminal inputs the context representation C into the second decoder, and generates an output sequence $Y=\{y(1), y(2) \ldots y(n)\}$ by using a vector of a fixed length as a condition, to obtain synthesized reference speech data. The foregoing method steps are merely used for understanding how to obtain the synthesized reference speech data but are not intended to limit the embodiments of this application.

S408: Determine an embedded vector for speech feature conversion according to a residual between the reference speech data and the synthesized reference speech data.

In an embodiment, the terminal calculates a difference between the reference speech data and the synthesized reference speech data, to obtain the residual representing the style feature. The terminal processes the obtained residual having the style feature, to obtain the embedded vector used for speech feature conversion and used for representing the style feature.

In the foregoing embodiment, the embedded vector for speech feature conversion is determined according to the residual between the reference speech data and the synthesized reference speech data, to obtain the embedded vector used for performing style control when speech synthesis is performed on linguistic data, so that the synthesized target synthesized speech data has a specific style feature, thereby improving the quality of the synthesized speech.

Figure 6:
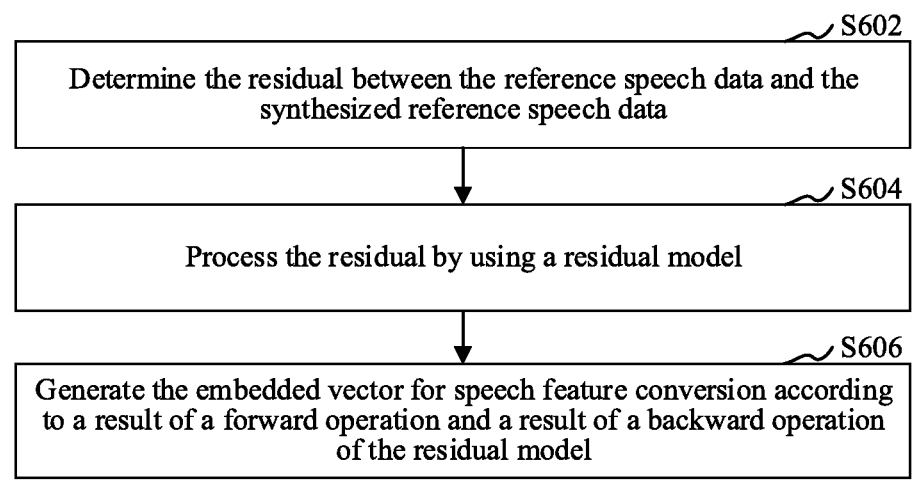
FIG. 6 is a schematic flowchart of steps of obtaining an embedded vector by using a residual model according to an embodiment.

In an embodiment, as shown in FIG. 6, S408 may include:

S602: Determine the residual between the reference speech data and the synthesized reference speech data.

In an embodiment, the terminal calculates a difference between the reference speech data and the synthesized reference speech data, to obtain the residual representing the style feature.

S604: Process the residual by using a residual model.

The residual model may be constructed by an RNN. The residual model may include four layers: two dense layers, a forward GRU layer, and a backward GRU layer from bottom to top. Each dense layer includes 128 units that are activated by using an activation function (such as a ReLU function). A dropout rate is 0.5. Each GRU layer includes 32 memory modules.

In an embodiment, S604 may include: inputting the residual into the residual model, and processing the residual by using the dense layers, the forward GRU layer, and the backward GRU layer of the residual model.

S606: Generate the embedded vector for speech feature conversion according to a result of a forward operation and a result of a backward operation of the residual model.

The embedded vector may also be referred to as an adaptive embedded vector. The style feature of the embedded vector is related to the reference speech data. For example, assuming that the reference speech data is obtained through acquiring the speech of Maggie Cheung, the style feature of the embedded vector is consistent with the speaking style feature of Maggie Cheung. For another example, assuming that the reference speech data is obtained through acquiring the speech of the user, the style feature of the embedded vector is consistent with the speaking style feature of the user.

In an embodiment, the terminal performs the forward operation on the residual by using the forward GRU layer of the residual model, to obtain the result of the forward operation. The terminal performs the backward operation on the residual by using the backward GRU layer of the residual model, to obtain the result of the backward operation.

In an embodiment, S606 may include: obtaining a first vector outputted in the last time step during the forward operation performed by the forward GRU layer of the residual model; obtaining a second vector outputted in the first time step during the backward operation performed by the backward GRU layer of the residual model; and superposing the first vector and the second vector, to obtain the embedded vector for speech feature conversion.

Figure 7:
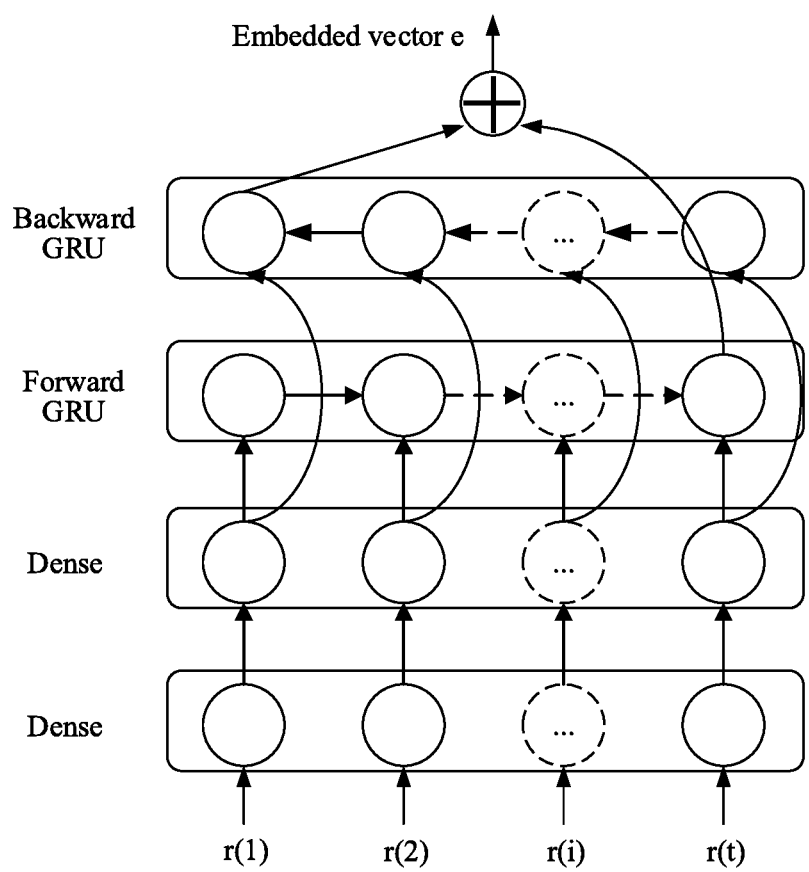
FIG. 7 is a schematic diagram of a structure of a residual model and a process of processing a residual in the residual model according to an embodiment.

In an example, as shown in FIG. 7, it is assumed that the obtained residual is R={r(1), r(2), . . . , r(t)}, where t is an integer greater than 1. The obtained residual R={r(1), r(2), . . . , r(t)} is inputted into the dense layers and the GRU layers in sequence. Finally, a hidden state in the last time step of the forward GRU layer is added to a hidden state in the first time step of the backward GRU layer, to obtain the embedded vector e used for representing the style feature.

Figure 8:
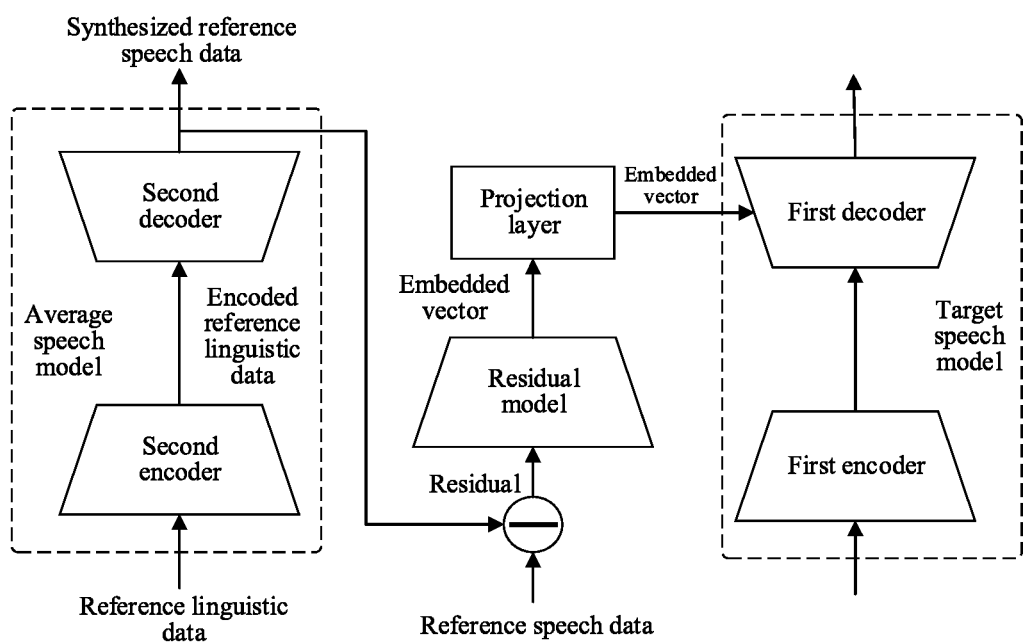
FIG. 8 is a schematic diagram of obtaining an embedded vector in an adaptive phase according to an embodiment.

S402 to S408 and S602 to S606 are steps of obtaining an embedded vector. In an example, as shown in FIG. 8, the embedded vector may be obtained by using the following method: The terminal obtains reference linguistic data and reference speech data having a style feature (for example, the speaking style feature of Maggie Cheung). The linguistic data is, for example, "Who is more beautiful, Xi Shi or Diao Chan". The terminal inputs the obtained linguistic data into the second encoder, and obtains encoded reference linguistic data through encoding processing by the second encoder. Then, the terminal decodes the encoded reference linguistic data to obtain synthesized reference speech data, and calculates a difference between the synthesized reference speech data and the reference speech data, to obtain a residual representing a style feature. The terminal processes the residual by using the residual model, to obtain an embedded vector capable of representing a speaking style.

In the foregoing embodiment, the residual between the reference speech data and the synthesized reference speech data is processed by using the residual model, to obtain the embedded vector for speech feature conversion, so that the embedded vector has the same style feature as the reference speech data and has an adaptive effect. In addition, the embedded vector used for performing style control when speech synthesis is performed on linguistic data is obtained, so that the synthesized target synthesized speech data has a specific style feature, thereby improving the quality of the synthesized speech.

Figure 9:
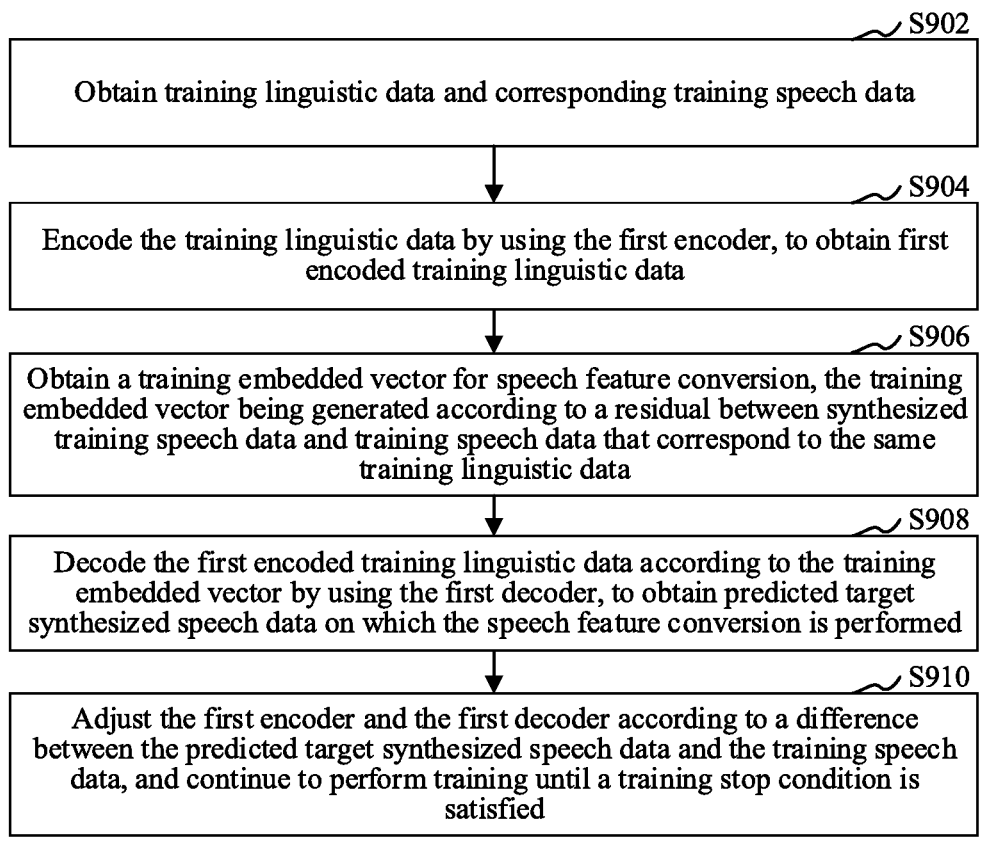
FIG. 9 is a schematic flowchart of steps of training a target speech model according to an embodiment.

In an embodiment, as shown in FIG. 9, the encoded linguistic data is obtained through encoding by using a first encoder, the target synthesized speech data is obtained through decoding by using a first decoder, and the method further includes:

S902: Obtain training linguistic data and corresponding training speech data.

The linguistic data may be text, a text feature, or a feature item. The training linguistic data is linguistic data used in a training phase and is used for training the first encoder and the first decoder.

In an embodiment, in a training process, the terminal obtains the training linguistic data and the training speech data having a style feature. For example, in a training process, a developer inputs training linguistic data used for training and training speech data having a style feature. The training linguistic data may be "I like eating, sleeping, and Beat Beans". After the linguistic data of "I like eating, sleeping, and Beat Beans" is trained, if a user sends a speech interaction signal of "Little robot, what do you like to do in your spare time?" when performing speech interaction with the terminal, the terminal outputs "I like eating, sleeping, and Beat Beans" as a response.

S904: Encode the training linguistic data by using the first encoder, to obtain first encoded training linguistic data.

In an embodiment, the terminal encodes the training linguistic data by using the first encoder, to obtain the first encoded training linguistic data. For example, the terminal obtains a piece of training text, and encodes the training text by using the first encoder, to obtain a distributed representation. The distributed representation is first encoded training linguistic data.

S906: Obtain a training embedded vector for speech feature conversion, the training embedded vector being generated according to a residual between synthesized training speech data and training speech data that correspond to the same training linguistic data.

The training embedded vector is a vector used for training the first encoder and the first decoder. The terminal combines and processes the training embedded vector and the corresponding first encoded training linguistic data, to obtain synthesized training speech data having the speaking style of the reference object. When the synthesized training speech data is played by using a speaker after being processed, the played synthesized speech is no longer a mechanical speech, but a speech with a human speaking style.

In an embodiment, before a user performs speech interaction with the terminal, the terminal obtains training linguistic data and training speech data having a style feature. A source of the training speech data may be selected by a developer, or may be obtained from a speech of the developer, or may be obtained from another speech having a specific speaking style. The terminal performs speech synthesis on the training linguistic data, to obtain synthesized training speech data having no style feature. The terminal calculates a difference between the synthesized training speech data and the training speech data, to obtain a residual representing the style feature. The terminal processes the residual to obtain a training embedded vector representing the style feature. The terminal stores the obtained training embedded vector into a style feature vector library.

In an embodiment, the step of processing, by the terminal, the residual to obtain a training embedded vector representing the style feature may include: processing the residual by using the plurality of dense layers of the residual model; separately inputting results outputted by the dense layers into the forward GRU layer and the backward GRU layer; and adding an output of the last time step of the forward GRU layer and an output of the first time step of the backward GRU layer, to obtain the training embedded vector used for speech feature conversion and capable of representing the style feature.

For example, if a developer intends to use speech data of Maggie Cheung as training speech data, the developer obtains and processes a speech of Maggie Cheung to obtain training speech data, and obtains corresponding linguistic data (for example, spoken text content, where the text content is, for example, "I like eating, sleeping, and Beat Beans"). The obtained training speech data has the speaking style of Maggie Cheung. The terminal performs speech synthesis on the linguistic data, to obtain synthesized training speech data having no speaking style. The terminal calculates a difference between the training speech data having the speaking style of Maggie Cheung and the synthesized training speech data having no speaking style, to obtain a residual representing a style feature. The terminal processes the obtained residual, to obtain a training embedded vector capable of representing the speaking style of Maggie Cheung.

In an embodiment, the terminal receives a specified style feature selection instruction, and obtains a training embedded vector corresponding to the style feature instruction from the style feature vector library. For example, a developer selects a target movie/sports star from the reference objects in the style selection interface of the terminal. In this case, the terminal receives a style feature instruction for the movie/sports star, and selects, according to the style feature instruction, a training embedded vector representing a speaking style of the movie/sports star.

S908: Decode the first encoded training linguistic data according to the training embedded vector by using the first decoder, to obtain predicted target synthesized speech data on which the speech feature conversion is performed.

In an embodiment, the terminal decodes the first encoded training linguistic data according to the training embedded vector by using the first decoder, to obtain the predicted target synthesized speech data on which the speech feature conversion is performed and that has the speaking style of the reference object. Alternatively, the terminal combines the training embedded vector and the first encoded training linguistic data, and decodes a result obtained through combination, to obtain the predicted target synthesized speech data on which the speech feature conversion is performed and that has the speaking style of the reference object.

S910: Adjust the first encoder and the first decoder according to a difference between the predicted target synthesized speech data and the training speech data, and continue to perform training until a training stop condition is satisfied.

In an embodiment, the terminal adjusts parameters of the first encoder and the first decoder according to the difference between the predicted target synthesized speech data and the training speech data, and continues to perform training until a speech style corresponding to the predicted target synthesized speech data is consistent with a speech style corresponding to the training speech data.

Figure 10:
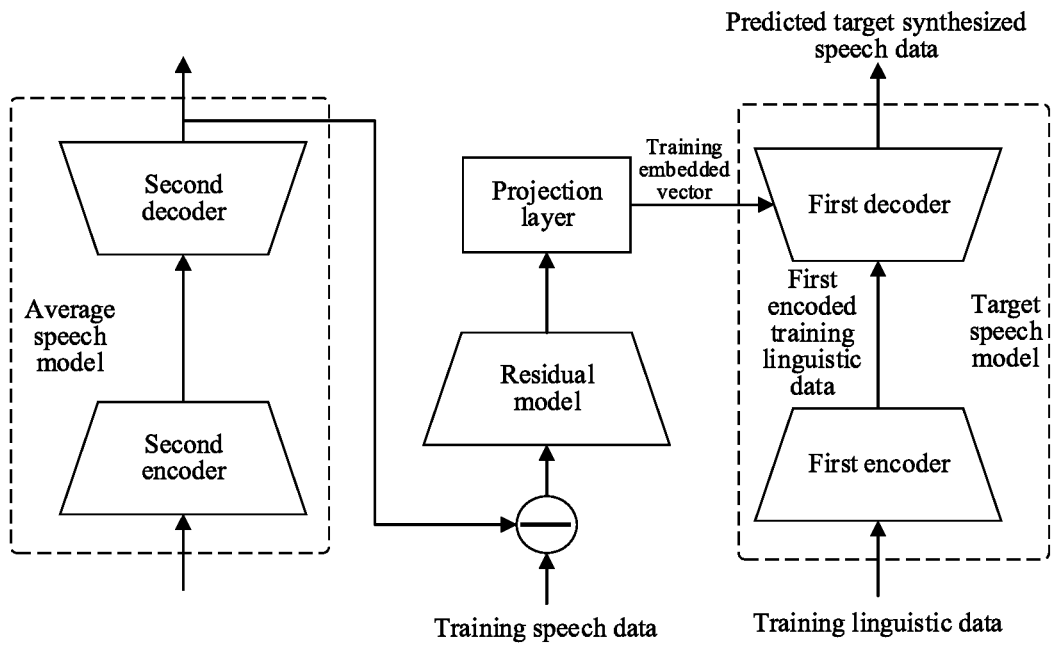
FIG. 10 is a schematic diagram of a data flow when a target speech model is trained in a model training phase according to an embodiment.

S902 to S910 are steps of training the first encoder and the first decoder. In an example, as shown in FIG. 10, the first encoder and the first decoder may be trained by using the following method: obtaining training linguistic data and training speech data having a style feature (for example, a speaking style feature of Maggie Cheung or the developer), and encoding the training linguistic data by using the first encoder, to obtain first encoded training linguistic data; obtaining a training embedded vector used for representing a style feature, and decoding the first encoded training linguistic data according to the training embedded vector by using the first decoder, to obtain predicted target synthesized speech data on which the speech feature conversion is performed; and adjusting the first encoder and the first decoder according to a difference between the predicted target synthesized speech data and the training speech data, and continuing to perform training until a training stop condition is satisfied.

In the foregoing embodiment, the training linguistic data, the training speech data, and the training embedded vector are processed by using the first encoder and the first decoder, to obtain the predicted target synthesized speech data. The first encoder and the first decoder are adjusted according to the difference between the predicted target synthesized speech data and the training speech data, to make the predicted target synthesized speech data continuously approximate to the training speech data, thereby obtaining the trained first encoder and first decoder. The training embedded vector generated according to the residual between the synthesized training speech data and the training speech data is used in the training process. The training embedded vector includes only a speech feature, and impact of a semantic feature on model training does not need to be considered, thereby reducing complexity of the first encoder and the first decoder, and improving accuracy of a training result.

Figure 11:
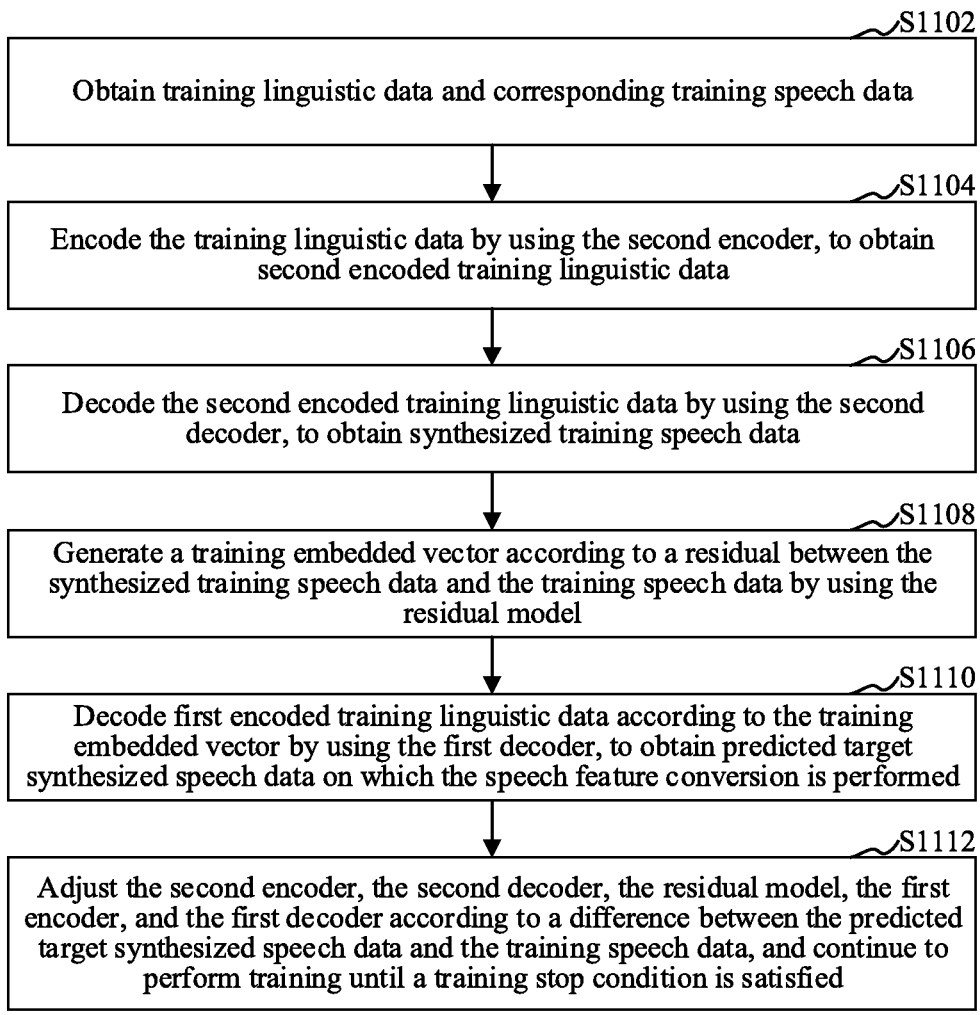
FIG. 11 is a schematic flowchart of steps of training an average speech model, a residual model, and a target speech model according to an embodiment.

In an embodiment, the encoded linguistic data is obtained through encoding by using a first encoder, the target synthesized speech data is obtained through decoding by using a first decoder, the encoded reference linguistic data is obtained through encoding by using a second encoder, the synthesized reference speech data is obtained through decoding by using a second decoder, and the embedded vector is obtained by using a residual model. As shown in FIG. 11, the method may further include:

S1102: Obtain training linguistic data and corresponding training speech data.

The training linguistic data is linguistic data used in a training phase and is used for training the first encoder and the first decoder.

In an embodiment, in a training process, the terminal obtains the training linguistic data and the training speech data having a style feature. For example, in a training process, a developer inputs training linguistic data used for training and training speech data having a style feature. The graining linguistic data may be "I like eating, sleeping, and Beat Beans".

S1104: Encode the training linguistic data by using the second encoder, to obtain second encoded training linguistic data.

In an embodiment, the terminal encodes the training linguistic data by using the second encoder, to obtain the second encoded training linguistic data. For example, the terminal obtains a piece of text, and encodes the text by using the first encoder, to obtain a distributed representation. The distributed representation is second encoded training linguistic data. The distributed representation may be an eigenvector. One eigenvector corresponds to one character or word in the text.

S1106: Decode the second encoded training linguistic data by using the second decoder, to obtain synthesized training speech data.

S1108: Generate a training embedded vector according to a residual between the synthesized training speech data and the training speech data by using the residual model.

In an embodiment, the terminal calculates a difference between the synthesized training speech data and the training speech data by using the residual model, to obtain a residual representing a style feature. The terminal processes the obtained residual having the style feature, to obtain the training embedded vector used for speech feature conversion and used for representing the style feature.

For a detailed process of obtaining the training embedded vector, reference may be made to S402 to S408 and S602 to S606, and details are not described herein again.

S1110: Decode first encoded training linguistic data according to the training embedded vector by using the first decoder, to obtain predicted target synthesized speech data on which the speech feature conversion is performed.

The first encoded training linguistic data is obtained by the first encoder encoding the training linguistic data.

In an embodiment, the terminal decodes the first encoded training linguistic data according to the training embedded vector by using the second decoder, to obtain the predicted target synthesized speech data on which the speech feature conversion is performed and that has the speaking style of the reference object. Alternatively, the terminal combines the training embedded vector and the first encoded training linguistic data, and decodes a result obtained through combination, to obtain the predicted target synthesized speech data on which the speech feature conversion is performed and that has the speaking style of the reference object.

S1112: Adjust the second encoder, the second decoder, the residual model, the first encoder, and the first decoder according to a difference between the predicted target synthesized speech data and the training speech data, and continue to perform training until a training stop condition is satisfied.

In an embodiment, the terminal adjusts parameters of the second encoder, the second decoder, the residual model, the first encoder, and the first decoder according to the difference between the predicted target synthesized speech data and the training speech data, and continues to perform training until a speech style corresponding to the predicted target synthesized speech data is consistent with a speech style corresponding to the training speech data.

Figure 12:
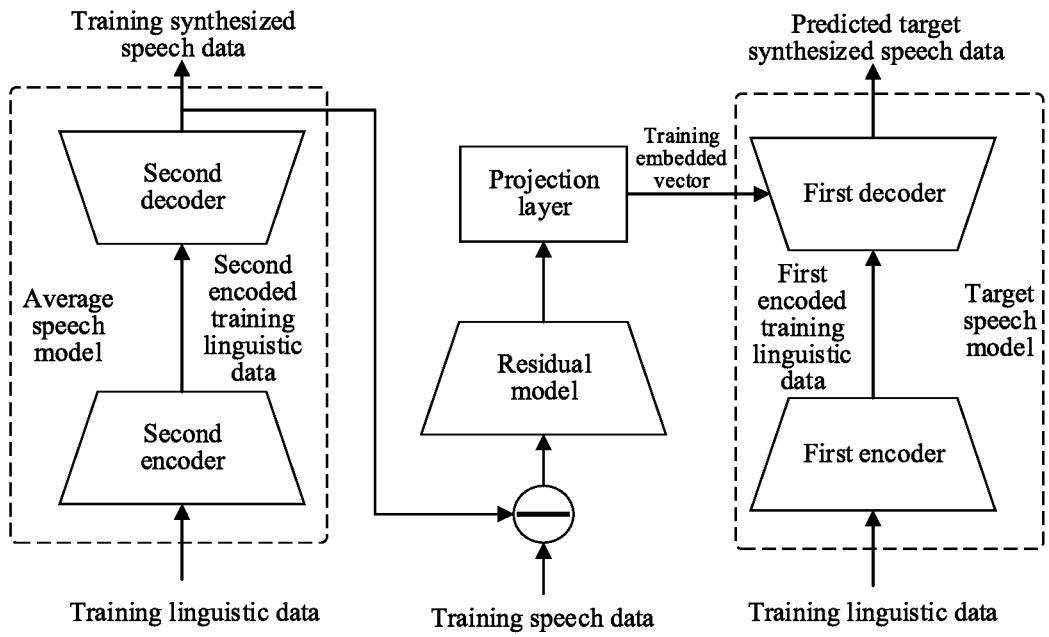
FIG. 12 is a schematic diagram of a data flow when an average speech model, a residual model, and a target speech model are trained in a model training phase according to an embodiment.

S1102 to S1112 are steps of training the second encoder, the second decoder, the residual model, the first encoder, and the first decoder. In an example, as shown in FIG. 12, the second encoder, the second decoder, the residual model, the first encoder, and the first decoder may be trained by using the following method: obtaining training linguistic data and training speech data having a style feature (for example, a speaking style feature of Maggie Cheung or the developer), encoding the training linguistic data by using the second encoder, to obtain second encoded training linguistic data, and decoding the second encoded training linguistic data by using the second decoder, to obtain synthesized training speech data. The terminal processes a residual between the synthesized training speech data and the training speech data by using the residual model, to obtain a training embedded vector used for representing the style feature. After the training linguistic data is encoded by using the first encoder to obtain first encoded training linguistic data, the first encoded training linguistic data is decoded according to the training embedded vector by using the first decoder, to obtain predicted target synthesized speech data on which the speech feature conversion is performed. The second encoder, the second decoder, the residual model, the first encoder, and the first decoder are adjusted according to a difference between the predicted target synthesized speech data and the training speech data, and training is performed continuously until a training stop condition is satisfied.

In the foregoing embodiment, the second encoder, the second decoder, the residual model, the first encoder, and the first decoder are trained by using the training linguistic data and corresponding training speech data. The second encoder, the second decoder, the residual model, the first encoder, and the first decoder are adjusted according to the difference between the predicted target synthesized speech data and the training speech data, to make the predicted target synthesized speech data continuously approximate to the training speech data, thereby obtaining the trained second encoder, second decoder, residual model, first encoder, and first decoder.

In addition, the training embedded vector generated according to the residual between the synthesized training speech data and the training speech data is used in the training process. The training embedded vector includes only a speech feature, and impact of a semantic feature on model training does not need to be considered, thereby reducing complexity of the second encoder, the second decoder, the residual model, the first encoder, and the first decoder, and improving accuracy of a training result.

Finally, the second encoder, the second decoder, and the residual model that are configured to obtain the embedded vector used for representing the style feature are combined with the first encoder and the first decoder that are configured to synthesize a speech, thereby reducing a data requirement of the speech synthesis system, and improving accuracy of establishing the speech synthesis system.

In an embodiment, S208 may include: splicing the encoded linguistic data and the embedded vector to obtain a spliced vector; and decoding the spliced vector to obtain the target synthesized speech data on which the speech feature conversion is performed.

In an embodiment, the embedded vector includes a rhyme duration feature, a fundamental frequency feature, and an energy feature. The step of splicing the encoded linguistic data and the embedded vector to obtain a spliced vector may include: determining target duration corresponding to a prosody of the target synthesized speech data according to the rhyme duration feature; and combining a phoneme sequence with the target duration, the fundamental frequency feature, and the energy feature, to obtain a combined feature.

In the foregoing embodiment, the encoded linguistic data and the embedded vector are spliced, and the vector obtained after the splicing is decoded to obtain the target synthesized speech data on which the speech feature conversion is performed. Because the vector obtained after the splicing has no semantic feature, processing of the encoded linguistic data by the semantic feature is avoided, thereby improving the quality of the synthesized speech.

In an embodiment, the method may further include: determining a speech amplitude spectrum corresponding to the target synthesized speech data; converting the speech amplitude spectrum into a speech waveform signal in a time domain; and generating a speech according to the speech waveform signal.

In an embodiment, the target synthesized speech data may be speech data in a frequency domain. The terminal obtains a corresponding speech amplitude spectrum from the target synthesized speech data in the frequency domain, and converts the speech amplitude spectrum into a speech waveform signal in a time domain by using a Griffin-Lim algorithm. The terminal converts the speech waveform signal into a synthesized speech carrying a style by using a world voice coder.

In the foregoing embodiment, the target synthesized speech data having the speech feature is converted into the speech signal, to obtain the speech having the style, thereby improving the quality of the synthesized speech.

Figure 13:
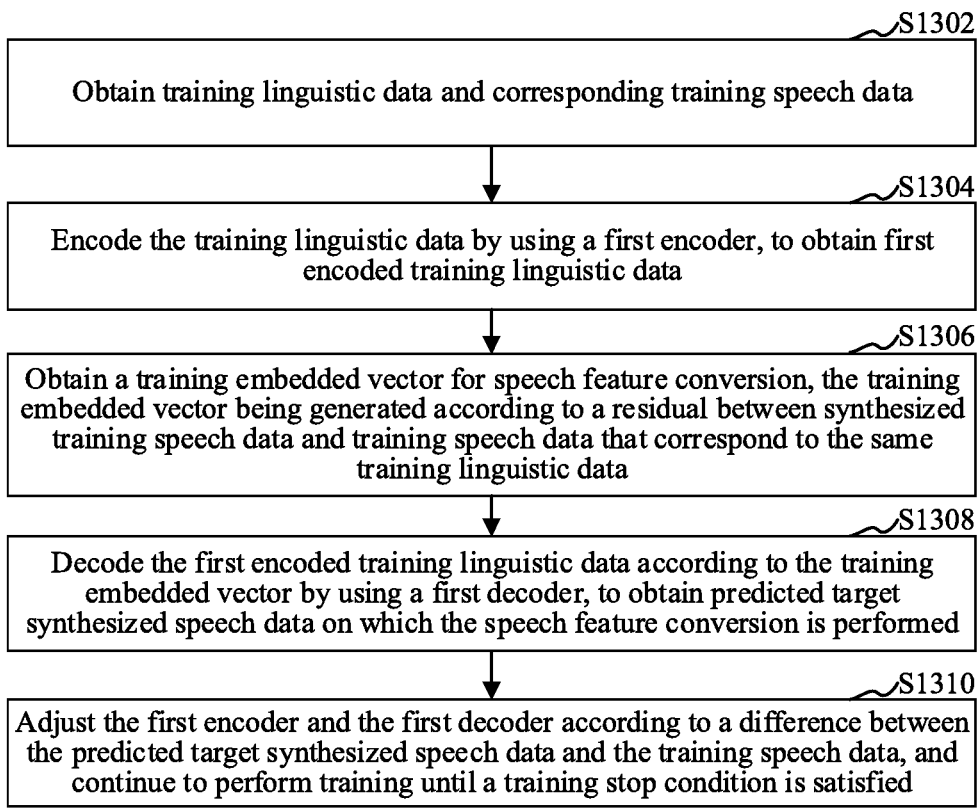
FIG. 13 is a schematic flowchart of steps of training a target speech model according to an embodiment.

As shown in FIG. 13, in an embodiment, a model training method is provided. This embodiment is mainly described by using an example in which the method is applied to the terminal on which the speech synthesis system is run in FIG. 1. Referring to FIG. 13, the model training method may include the following steps:

S1302: Obtain training linguistic data and corresponding training speech data.

The linguistic data may be text, or a feature or a feature item of text. The training linguistic data is linguistic data used in a training phase and is used for training the first encoder and the first decoder.

In an embodiment, in a training process, the terminal obtains the training linguistic data and the training speech data having a style feature. For example, in a training process, a developer inputs training linguistic data used for training and training speech data having a style feature. The training linguistic data may be "I like eating, sleeping, and Beat Beans". After the linguistic data "I like eating, sleeping, and Beat Beans" is trained, if a user sends a speech interaction signal "Little robot, what do you like to do?" when performing speech interaction with the terminal, the terminal outputs "I like eating, sleeping, and Beat Beans" as a response.

S1304: Encode the training linguistic data by using a first encoder, to obtain first encoded training linguistic data.

In an embodiment, the terminal encodes the training linguistic data by using the first encoder, to obtain the first encoded training linguistic data. For example, the terminal obtains a piece of training text, and encodes the training text by using the first encoder, to obtain a distributed representation. The distributed representation is first encoded training linguistic data. The distributed representation may be an eigenvector. One eigenvector corresponds to one character or word in the text.

S1306: Obtain a training embedded vector for speech feature conversion, the training embedded vector being generated according to a residual between synthesized training speech data and training speech data that correspond to the same training linguistic data.

The embedded vector may be a vector having a speaking style feature of a reference object, and the reference object may be a person that is selected by a developer and that has a specific speaking style in a training process. The training embedded vector is a vector used for training the first encoder and the first decoder. The terminal combines and processes the training embedded vector and the corresponding first encoded training linguistic data, to obtain synthesized training speech data having the speaking style of the reference object. When the synthesized training speech data is played by using a speaker after being processed, the played synthesized speech is no longer a mechanical speech, but a speech with a human speaking style.

In an embodiment, before a user performs speech interaction with the terminal, the terminal obtains training linguistic data and training speech data having a style feature. A source of the training speech data may be selected by a developer, or may be obtained from a speech of the developer, or may be obtained from another speech having a specific speaking style. The terminal performs speech synthesis on the training linguistic data, to obtain synthesized training speech data having no style feature. The terminal calculates a difference between the synthesized training speech data and the training speech data, to obtain a residual representing a style feature. The terminal processes the residual to obtain a training embedded vector representing a style feature. The terminal stores the obtained training embedded vector into a style feature vector library. The style feature vector library may store training embedded vectors corresponding to a plurality of reference objects, and the reference object may be a person having a special speaking style. The residual representing the style feature may be essentially a residual sequence.

In an embodiment, the step of processing, by the terminal, the residual to obtain a training embedded vector representing a style feature may include: processing the residual by using a plurality of dense layers of the residual model; receptively inputting results outputted by the dense layer into a forward GRU layer and a backward GRU layer; and adding an output of the last time step of the forward GRU layer and an output of the first time step of the backward GRU layer, to obtain the training embedded vector used for speech feature conversion and capable of representing the style feature.

For example, if a developer intends to use speech data of Maggie Cheung as training speech data, the developer obtains and processes a speech of Maggie Cheung to obtain training speech data, and obtains corresponding linguistic data (for example, spoken text content, where the text content is, for example, "I like eating, sleeping, and Beat Beans"). The obtained training speech data has the speaking style of Maggie Cheung. The terminal performs speech synthesis on the linguistic data, to obtain synthesized training speech data having no speaking style. The terminal calculates a difference between the training speech data having the speaking style of Maggie Cheung and the synthesized training speech data having no speaking style, to obtain a residual representing a style feature. The terminal processes the obtained residual, to obtain a training embedded vector capable of representing the speaking style of Maggie Cheung.

In an embodiment, the terminal receives a specified style feature selection instruction, and obtains a training embedded vector corresponding to the style feature instruction from the style feature vector library. For example, if a developer intends to hear the voice of a movie/sports star, the user selects a target movie/sports star from the reference objects in the style selection interface of the terminal. In this case, the terminal receives a style feature instruction for the movie/sports star, and selects, according to the style feature instruction, a training embedded vector representing a speaking style of the movie/sports star.

S1308: Decode the first encoded training linguistic data according to the training embedded vector by using a first decoder, to obtain predicted target synthesized speech data on which the speech feature conversion is performed.

In an embodiment, the terminal decodes the first encoded training linguistic data according to the training embedded vector by using the first decoder, to obtain the predicted target synthesized speech data on which the speech feature conversion is performed and that has the speaking style of the reference object. Alternatively, the terminal combines the training embedded vector and the first encoded training linguistic data, and decodes a result obtained through combination, to obtain the predicted target synthesized speech data on which the speech feature conversion is performed and that has the speaking style of the reference object.

S1310: Adjust the first encoder and the first decoder according to a difference between the predicted target synthesized speech data and the training speech data, and continue to perform training until a training stop condition is satisfied.

In an embodiment, the terminal adjusts parameters of the first encoder and the first decoder according to the difference between the predicted target synthesized speech data and the training speech data, and continues to perform training until a speech style corresponding to the predicted target synthesized speech data is consistent with a speech style corresponding to the training speech data.

S1302 to S1310 are steps of training the first encoder and the first decoder. In an example, as shown in FIG. 10, the first encoder and the first decoder may be trained by using the following method: obtaining training linguistic data and training speech data having a style feature (for example, a speaking style feature of Maggie Cheung or the developer), and encoding the training linguistic data by using the first encoder, to obtain first encoded training linguistic data; obtaining a training embedded vector used for representing a style feature, and decoding the first encoded training linguistic data according to the training embedded vector by using the first decoder, to obtain predicted target synthesized speech data on which the speech feature conversion is performed; and adjusting the first encoder and the first decoder according to a difference between the predicted target synthesized speech data and the training speech data, and continuing to perform training until a training stop condition is satisfied.

In the foregoing embodiment, the training linguistic data, the training speech data, and the training embedded vector are processed by using the first encoder and the first decoder, to obtain the predicted target synthesized speech data. The first encoder and the first decoder are adjusted according to the difference between the predicted target synthesized speech data and the training speech data, to make the predicted target synthesized speech data continuously approximate to the training speech data, thereby obtaining the trained first encoder and first decoder. The training embedded vector generated according to the residual between the synthesized training speech data and the training speech data is used in the training process. The training embedded vector includes only a speech feature, and impact of a semantic feature on model training does not need to be considered, thereby reducing complexity of the first encoder and the first decoder, and improving accuracy of a training result.

Figure 14:
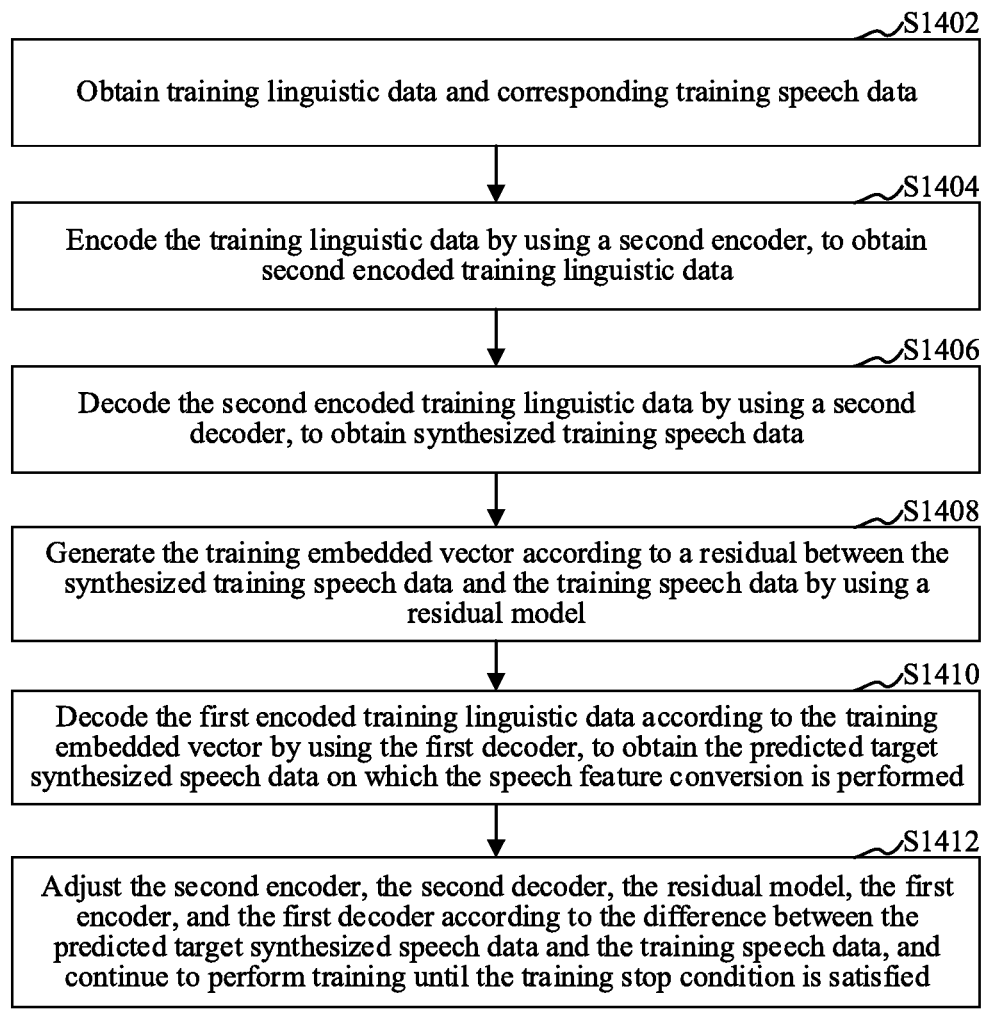
FIG. 14 is a schematic flowchart of steps of training an average speech model, a residual model, and a target speech model according to an embodiment.

In an embodiment, as shown in FIG. 14, the method may further include:

S1402: Obtain training linguistic data and corresponding training speech data.

The linguistic data may be text, or a feature or a feature item of text. The training linguistic data is linguistic data used in a training phase and is used for training the first encoder and the first decoder.

In an embodiment, in a training process, the terminal obtains the training linguistic data and the training speech data having a style feature. For example, in a training process, a developer inputs training linguistic data used for training and training speech data having a style feature. The training linguistic data may be "I like eating, sleeping, and Beat Beans".

S1404: Encode the training linguistic data by using a second encoder, to obtain second encoded training linguistic data.

In an embodiment, the terminal encodes the training linguistic data by using the second encoder, to obtain the second encoded training linguistic data. For example, the terminal obtains a piece of text, and encodes the text by using the first encoder, to obtain a distributed representation. The distributed representation is second encoded training linguistic data. The distributed representation may be an eigenvector. One eigenvector corresponds to one character or word in the text.

S1406: Decode the second encoded training linguistic data by using a second decoder, to obtain synthesized training speech data.

S1408: Generate the training embedded vector according to a residual between the synthesized training speech data and the training speech data by using a residual model.

In an embodiment, the terminal calculates a difference between the synthesized training speech data and the training speech data by using the residual model, to obtain a residual representing a style feature. The terminal processes the obtained residual having the style feature, to obtain the training embedded vector used for speech feature conversion and used for representing the style feature.

For a detailed process of obtaining the training embedded vector, reference may be made to S402 to S408 and S602 to S606, and details are not described herein again.

S1410: Decode the first encoded training linguistic data according to the training embedded vector by using the first decoder, to obtain the predicted target synthesized speech data on which the speech feature conversion is performed.

In an embodiment, the terminal decodes the second encoded training linguistic data according to the training embedded vector by using the second decoder, to obtain the predicted target synthesized speech data on which the speech feature conversion is performed and that has the speaking style of the reference object. Alternatively, the terminal combines the training embedded vector and the second encoded training linguistic data, and decodes a result obtained through combination, to obtain the predicted target synthesized speech data on which the speech feature conversion is performed and that has the speaking style of the reference object.

S1412: Adjust the second encoder, the second decoder, the residual model, the first encoder, and the first decoder according to the difference between the predicted target synthesized speech data and the training speech data, and continue to perform training until the training stop condition is satisfied.

In an embodiment, the terminal adjusts parameters of the second encoder, the second decoder, the residual model, the first encoder, and the first decoder according to the difference between the predicted target synthesized speech data and the training speech data, and continues to perform training until a speech style corresponding to the predicted target synthesized speech data is consistent with a speech style corresponding to the training speech data.

S1402 to S1412 are steps of training the second encoder, the second decoder, the residual model, the first encoder, and the first decoder. In an example, as shown in FIG. 12, the second encoder, the second decoder, the residual model, the first encoder, and the first decoder may be trained by using the following method: obtaining training linguistic data and training speech data having a style feature (for example, a speaking style feature of Maggie Cheung or the developer), encoding the training linguistic data by using the second encoder, to obtain second encoded training linguistic data, and decoding the second encoded training linguistic data by using the second decoder, to obtain synthesized training speech data. The terminal processes a residual between the synthesized training speech data and the training speech data by using the residual model, to obtain a training embedded vector used for representing the style feature. After the training linguistic data is encoded by using the first encoder to obtain first encoded training linguistic data, the first encoded training linguistic data is decoded according to the training embedded vector by using the first decoder, to obtain predicted target synthesized speech data on which the speech feature conversion is performed. The second encoder, the second decoder, the residual model, the first encoder, and the first decoder are adjusted according to a difference between the predicted target synthesized speech data and the training speech data, and training is performed continuously until a training stop condition is satisfied.

In the foregoing embodiment, the second encoder, the second decoder, the residual model, the first encoder, and the first decoder are trained by using the training linguistic data and corresponding training speech data. The second encoder, the second decoder, the residual model, the first encoder, and the first decoder are adjusted according to the difference between the predicted target synthesized speech data and the training speech data, to make the predicted target synthesized speech data continuously approximate to the training speech data, thereby obtaining the trained second encoder, second decoder, residual model, first encoder, and first decoder.

In addition, the training embedded vector generated according to the residual between the synthesized training speech data and the training speech data is used in the training process. The training embedded vector includes only a speech feature, and impact of a semantic feature on model training does not need to be considered, thereby reducing complexity of the second encoder, the second decoder, the residual model, the first encoder, and the first decoder, and improving accuracy of a training result.

Finally, the second encoder, the second decoder, and the residual model that are configured to obtain the embedded vector used for representing the style feature are combined with the first encoder and the first decoder that are configured to synthesize a speech, thereby reducing a data requirement of the speech synthesis system, and improving accuracy of establishing the speech synthesis system.

In a conventional speech synthesis solution, an overall idea is as follows: In a training phase, an encoder is trained to obtain an embedded vector of a style from a mel-frequency cepstrum of reference audio, and then the embedded vector is used to instruct a Tacotron to perform modeling on style data. In a speech synthesis phase, a mel-frequency cepstrum of reference audio is given. First, an embedded vector representing a style is obtained by using the trained encoder, and then the embedded vector is used to instruct the Tacotron to generate a speech of a corresponding style.

The foregoing solution has the following problems: (1) Style features need to be manually annotated, which is time-consuming and labor-intensive, and it is not easy to expand to different style features. (2) In the speech synthesis phase, an additional style vector module is required to predict a style feature, to input the style feature obtained through prediction into a speech synthesis model to synthesize a speech having a style, which increases training time consumption. (3) When a style feature is obtained, a mel-frequency cepstrum is inputted, and the mel-frequency cepstrum includes style features and semantic features, resulting in more complex modeling of the speech synthesis model. (4) Because the mel-frequency cepstrum includes both the style features and the semantic features, and the semantic features have some impact on extraction of the style features, accuracy of the extraction of the style feature is affected.

An embodiment of this application provides a solution, to resolve the foregoing problems. As shown in FIG. 1, a speech synthesis system includes an average speech model, a residual model, a projection layer, and a target speech model. The target speech model includes a first encoder and a first decoder. The first encoder and the first decoder may respectively be a linguistic data encoder and a speech data decoder. In addition, the first encoder and the first decoder may alternatively be attention-based recursive generators.

The average speech model includes a second encoder and a second decoder. The second encoder and the second decoder may respectively be a linguistic data encoder and a speech data decoder. In addition, the second encoder and the second decoder may alternatively be attention-based recursive generators.

The average speech model and the target speech model may both be based on a Tacotron model, including a decoder and an encoder. The average speech model performs training on training linguistic data, to obtain speech data of an average style. The residual model encodes a difference between the predicted average synthesized speech data and target speech data to obtain an embedded vector of a style feature. The projection layer projects the embedded vector into the first decoder space of the target speech model.

Before a synthesized speech is obtained, the following three phases need to be used: a training phase, an adaptive phase, and a test phase.

(1) Training Phase

As shown in FIG. 12, the average synthesized training speech data is first predicted from the inputted training linguistic data by using the average speech model. The average speech model includes the second encoder (such as a linguistic data encoder) and the second decoder (such as a speech data decoder). The second encoder is configured to encode the training linguistic data, to obtain a hidden layer representation. The second decoder is configured to decode the hidden layer representation, to obtain the synthesized training speech data. The hidden layer representation indicates the encoded linguistic data according to the embodiments of this application.

A difference between the obtained synthesized training speech data and the target training speech data carrying a style feature is calculated, to obtain a residual between the synthesized training speech data and the training speech data. The residual is inputted into the residual model, to obtain a training embedded vector used for representing a style feature. The training embedded vector is projected to the first decoder of the target speech model by using the projection layer.

In the target speech model, similar to the average speech model, the training linguistic data is inputted, and the hidden layer representation is obtained through encoding by using the first encoder. The first decoder obtains the predicted target synthesized speech data having a style by decoding according to the hidden layer representation and the training embedded vector projected from the projection layer.

In the entire training process, the training embedded vector is obtained through data driving and automatic learning.

The average speech model, the residual model, and the target speech model are adjusted according to a difference between the predicted target synthesized speech data and the training speech data, and training is performed continuously until the predicted target synthesized speech data is approximate to the training speech data at most, so that a style of a finally outputted synthesized speech is consistent with a style of the speech data used for training, thereby obtaining the trained average speech model, residual model, and target speech model.

(2) Adaptive Phase

The adaptive phase is mainly to obtain an embedded vector of a target style by using the trained average speech model, residual model, and target speech model. For example, as shown in FIG. 8, if a user intends to hear the speaking style of Maggie Cheung when performing speech interaction with the terminal, the user may use speech data of Maggie Cheung as reference speech data, and obtain corresponding reference linguistic data. The obtained reference linguistic data is inputted into the trained average speech model, to obtain synthesized reference speech data. A difference between the synthesized reference speech data and the reference speech data is calculated, to obtain a residual representing a style feature. The residual is inputted into the residual model, to obtain an embedded vector representing a style feature.

An adaptive style embedded vector may be quickly obtained by using the average speech model and the residual model that are obtained through training in the training phase. The process does not need to be trained, thereby greatly improving an adaption speed and reducing adaption time.

(3) Test Phase

In the test phase, as shown in FIG. 3, when a user performs speech interaction with the terminal, given linguistic data is first inputted into the first encoder of the target speech model for encoding, to obtain a hidden layer representation. The first decoder is controlled by using the embedded vector obtained in the adaptive phase, to obtain target synthesized speech data of a style similar to the style of the adaptive reference sample. For example, if the reference speech data used in the adaptive phase is from Maggie Cheung, the style of the obtained target synthesized speech data is the speaking style of Maggie Cheung.

The outputted target synthesized speech data is further restored to a speech waveform signal by using a Griffin-Lim algorithm.

Implementation of the embodiments of this application may have the following beneficial effects: Style features do not need to be manually annotated, thereby reducing costs of constructing the speech synthesis system. The residual is used as a control condition, so that use of a mel-frequency cepstrum is avoided, thereby reducing complexity of modeling and improving accuracy of style feature extraction. The style vector module (that is, the residual model) and the speech synthesis model may be modeled and trained at the same time, thereby avoiding use of an additional style vector module, reducing training time consumption, and implementing quick adaption to obtain the embedded vector required for synthesizing a speech.

FIG. 2 is a schematic flowchart of a speech synthesis method according to an embodiment. FIG. 13 is a schematic flowchart of a model training method according to an embodiment. It is to be understood that, although the steps in the flowcharts of FIG. 2 and FIG. 13 are displayed sequentially according to indication of arrows, the steps are not necessarily performed sequentially according to a sequence indicated by the arrows. Unless explicitly specified in this specification, the steps are performed without any strict sequence limit, and may be performed in another sequence. Furthermore, at least some steps in FIG. 2 and FIG. 13 may include a plurality of sub-steps or a plurality of phases. The sub-steps or phases are not necessarily performed at the same moment, and may be performed at different moments. The sub-steps or phases are not necessarily performed sequentially, and may be performed in turn or alternately with other steps or at least some of sub-steps or phases of other steps.

Figure 15:
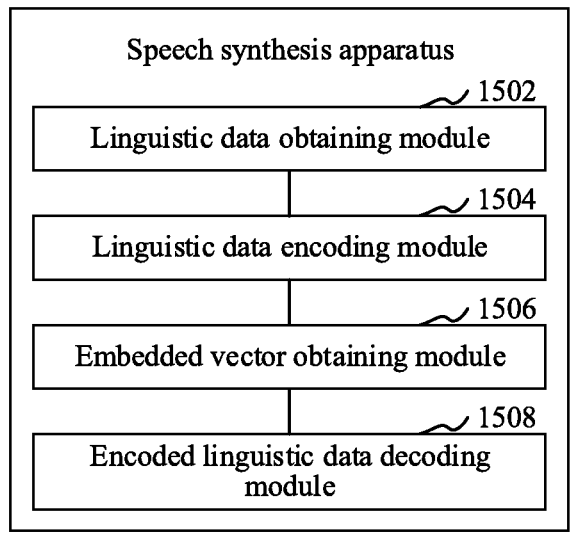
FIG. 15 is a structural block diagram of a speech synthesis apparatus according to an embodiment.

As shown in FIG. 15, in an embodiment, a speech synthesis apparatus is provided. The speech synthesis apparatus may include: a linguistic data obtaining module 1502, a linguistic data encoding module 1504, an embedded vector obtaining module 1506, and an encoded linguistic data decoding module 1508.

The linguistic data obtaining module 1502 is configured to obtain to-be-processed linguistic data.

The linguistic data encoding module 1504 is configured to encode the linguistic data, to obtain encoded linguistic data.

The embedded vector obtaining module 1506 is configured to obtain an embedded vector for speech feature conversion, the embedded vector being generated according to a residual between synthesized reference speech data and reference speech data that correspond to the same reference linguistic data.

The encoded linguistic data decoding module 1508 is configured to decode the encoded linguistic data according to the embedded vector, to obtain target synthesized speech data on which the speech feature conversion is performed.

In the foregoing embodiment, the to-be-processed linguistic data is obtained, and the linguistic data is encoded, so that the encoded linguistic data representing pronunciation can be obtained. The embedded vector for speech feature conversion is obtained. Because the embedded vector is generated according to the residual between the synthesized reference speech data and the reference speech data that correspond to the same reference linguistic data, the obtained embedded vector is a style feature vector that does not include a semantic feature. The encoded linguistic data is decoded according to the embedded vector, avoiding impact of the semantic feature on processing of the encoded linguistic data. Therefore, the obtained target synthesized speech data has high quality, thereby improving quality of the synthesized speech.

Figure 16:
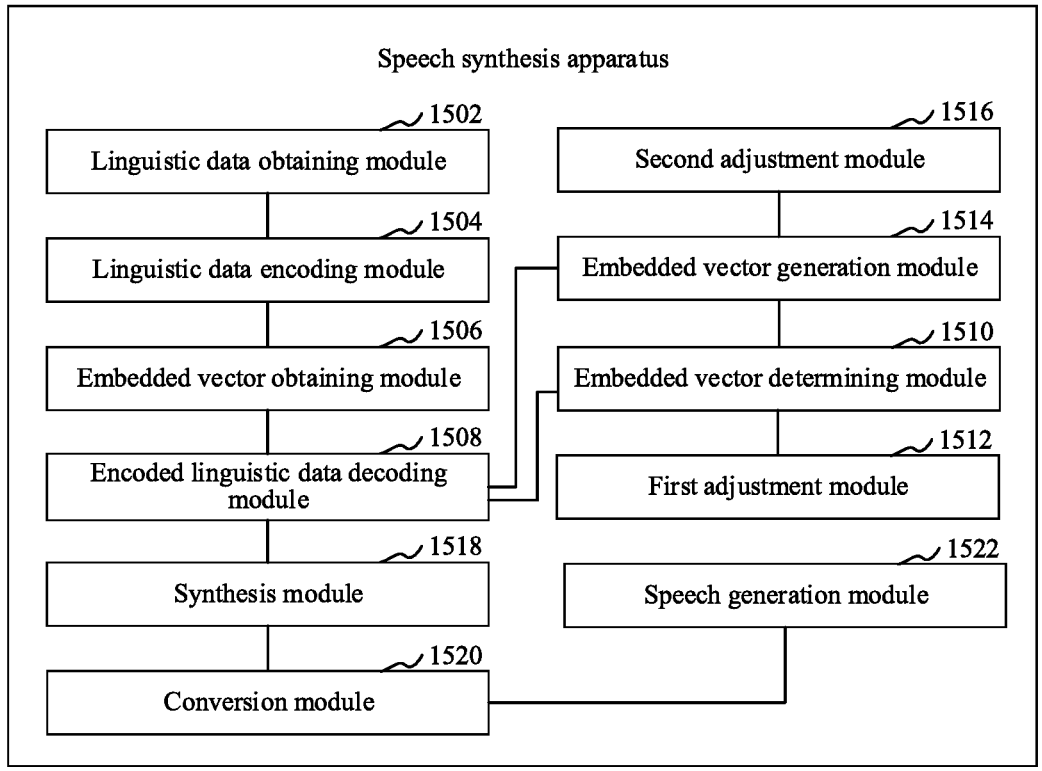
FIG. 16 is a structural block diagram of a speech synthesis apparatus according to another embodiment.

In an embodiment, as shown in FIG. 16, the apparatus may further include an embedded vector determining module 1510.

The linguistic data obtaining module 1502 is further configured to obtain reference linguistic data and corresponding reference speech data.

The linguistic data encoding module 1504 is further configured to encode the reference linguistic data, to obtain encoded reference linguistic data.

The encoded linguistic data decoding module 1508 is further configured to decode the encoded reference linguistic data, to obtain synthesized reference speech data.

The embedded vector determining module 1510 is configured to determine an embedded vector for speech feature conversion according to a residual between the reference speech data and the synthesized reference speech data.

In the foregoing embodiment, the embedded vector for speech feature conversion is determined according to the residual between the reference speech data and the synthesized reference speech data, to obtain the embedded vector used for performing style control when speech synthesis is performed on linguistic data, so that the synthesized target synthesized speech data has a specific style feature, thereby improving the quality of the synthesized speech.

In an embodiment, the embedded vector determining module 1510 is further configured to determine the residual between the reference speech data and the synthesized reference speech data; process the residual by using a residual model; and generate the embedded vector for speech feature conversion according to a result of a forward operation and a result of a backward operation of the residual model.

In an embodiment, the embedded vector determining module 1510 is further configured to process the residual by using a dense layer, a forward GRU layer, and a backward GRU layer of the residual model.

In an embodiment, the embedded vector determining module 1510 is further configured to obtain a first vector outputted in the last time step during the forward operation performed by a forward GRU layer of the residual model; obtain a second vector outputted in the first time step during the backward operation performed by a backward GRU layer of the residual model; and superpose the first vector and the second vector, to obtain the embedded vector for speech feature conversion.

In the foregoing embodiment, the residual between the reference speech data and the synthesized reference speech data is processed by using the residual model, to obtain the embedded vector for speech feature conversion, so that the embedded vector has a style feature the same as that of the reference speech data and has an adaptive effect. In addition, the embedded vector used for performing style control when speech synthesis is performed on linguistic data is obtained, so that the synthesized target synthesized speech data has a specific style feature, thereby improving the quality of the synthesized speech.

In an embodiment, the encoded linguistic data is obtained through encoding by using a first encoder, and the target synthesized speech data is obtained through decoding by using a first decoder. As shown in FIG. 16, the apparatus further includes a first adjustment module 1512.

The linguistic data obtaining module 1502 is further configured to obtain training linguistic data and corresponding training speech data.

The linguistic data encoding module 1504 is further configured to encode the training linguistic data by using the first encoder, to obtain first encoded training linguistic data.

The embedded vector obtaining module 1506 is further configured to obtain a training embedded vector for speech feature conversion, the training embedded vector being generated according to a residual between synthesized training speech data and training speech data that correspond to the same training linguistic data.

The encoded linguistic data decoding module 1508 is further configured to decode the first encoded training linguistic data according to the training embedded vector by using the first decoder, to obtain predicted target synthesized speech data on which the speech feature conversion is performed.

The first adjustment module 1512 is configured to adjust the first encoder and the first decoder according to a difference between the predicted target synthesized speech data and the training speech data, and continue to perform training until a training stop condition is satisfied.

In the foregoing embodiment, the training linguistic data, the training speech data, and the training embedded vector are processed by using the first encoder and the first decoder, to obtain the predicted target synthesized speech data. The first encoder and the first decoder are adjusted according to the difference between the predicted target synthesized speech data and the training speech data, to make the predicted target synthesized speech data continuously approximate to the training speech data, thereby obtaining the trained first encoder and first decoder. The training embedded vector generated according to the residual between the synthesized training speech data and the training speech data is used in the training process. The training embedded vector includes only a speech feature, and impact of a semantic feature on model training does not need to be considered, thereby reducing complexity of the first encoder and the first decoder, and improving accuracy of a training result.

In an embodiment, the encoded linguistic data is obtained through encoding by using a first encoder, the target synthesized speech data is obtained through decoding by using a first decoder, the encoded reference linguistic data is obtained through encoding by using a second encoder, the synthesized reference speech data is obtained through decoding by using a second decoder, and the embedded vector is obtained by using a residual model.

In an embodiment, as shown in FIG. 16, the apparatus further includes an embedded vector generation module 1514 and a second adjustment module 1516.

The linguistic data obtaining module 1502 is further configured to obtain training linguistic data and corresponding training speech data.

The linguistic data encoding module 1504 is further configured to encode the training linguistic data by using the second encoder, to obtain second encoded training linguistic data.

The encoded linguistic data decoding module 1508 is further configured to decode the second encoded training linguistic data by using the second decoder, to obtain synthesized training speech data.

The embedded vector generation module 1514 is configured to generate a training embedded vector according to a residual between the synthesized training speech data and the training speech data by using the residual model.

The encoded linguistic data decoding module 1508 is further configured to decode first encoded training linguistic data according to the training embedded vector by using the first decoder, to obtain predicted target synthesized speech data on which the speech feature conversion is performed, where the first encoded training linguistic data is obtained by the first encoder encoding the training linguistic data.

The second adjustment module 1516 is configured to adjust the second encoder, the second decoder, the residual model, the first encoder, and the first decoder according to a difference between the predicted target synthesized speech data and the training speech data, and continue to perform training until a training stop condition is satisfied.

In the foregoing embodiment, the second encoder, the second decoder, the residual model, the first encoder, and the first decoder are trained by using the training linguistic data and corresponding training speech data. The second encoder, the second decoder, the residual model, the first encoder, and the first decoder are adjusted according to the difference between the predicted target synthesized speech data and the training speech data, to make the predicted target synthesized speech data continuously approximate to the training speech data, thereby obtaining the trained second encoder, second decoder, residual model, first encoder, and first decoder.

In addition, the training embedded vector generated according to the residual between the synthesized training speech data and the training speech data is used in the training process. The training embedded vector includes only a speech feature, and impact of a semantic feature on model training does not need to be considered, thereby reducing complexity of the second encoder, the second decoder, the residual model, the first encoder, and the first decoder, and improving accuracy of a training result.

Finally, the second encoder, the second decoder, and the residual model that are configured to obtain the embedded vector used for representing the style feature are combined with the first encoder and the first decoder that are configured to synthesize a speech, thereby reducing a data requirement of the speech synthesis system, and improving accuracy of establishing the speech synthesis system.

In an embodiment, the encoded linguistic data decoding module 1508 is further configured to splice the encoded linguistic data and the embedded vector to obtain a spliced vector; and decode the spliced vector to obtain the target synthesized speech data on which the speech feature conversion is performed.

In the foregoing embodiment, the encoded linguistic data and the embedded vector are spliced, and the vector obtained after the splicing is decoded to obtain the target synthesized speech data on which the speech feature conversion is performed. Because the vector obtained after the splicing has no semantic feature, processing of the encoded linguistic data by the semantic feature is avoided, thereby improving the quality of the synthesized speech.

In an embodiment, as shown in FIG. 16, the apparatus further includes a synthesis module 1518, a conversion module 1520, and a speech generation module 1522.

The synthesis module 1518 is configured to determine a speech amplitude spectrum corresponding to the target synthesized speech data.

The conversion module 1520 is configured to convert the speech amplitude spectrum into a speech waveform signal in a time domain.

The speech generation module 1522 is configured to generate a speech according to the speech waveform signal.

In the foregoing embodiment, the target synthesized speech data having the speech feature is converted into the speech signal, to obtain the speech having the style, thereby improving the quality of the synthesized speech.

Figure 17:
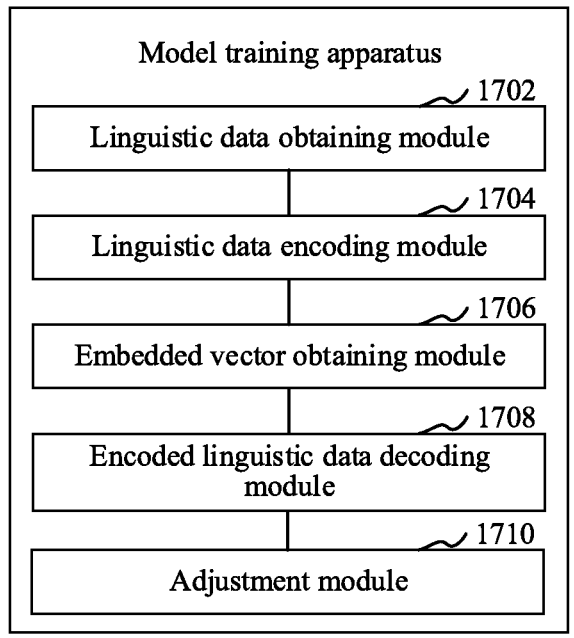
FIG. 17 is a structural block diagram of a model training apparatus according to an embodiment.

As shown in FIG. 17, in an embodiment, a model training apparatus is provided. The model training apparatus may include a speech data obtaining module 1702, a linguistic data encoding module 1704, an embedded vector obtaining module 1706, an encoded linguistic data decoding module 1708, and an adjustment module 1710.

The speech data obtaining module 1702 is configured to obtain training linguistic data and corresponding training speech data.

The linguistic data encoding module 1704 is configured to encode the training linguistic data by using a first encoder, to obtain first encoded training linguistic data.

The embedded vector obtaining module 1706 is configured to obtain a training embedded vector for speech feature conversion, the training embedded vector being generated according to a residual between synthesized training speech data and training speech data that correspond to the same training linguistic data.

The encoded linguistic data decoding module 1708 is configured to decode the first encoded training linguistic data according to the training embedded vector by using a first decoder, to obtain predicted target synthesized speech data on which the speech feature conversion is performed.

The adjustment module 1710 is configured to adjust the first encoder and the first decoder according to a difference between the predicted target synthesized speech data and the training speech data, and continue to perform training until a training stop condition is satisfied.

In the foregoing embodiment, the training linguistic data, the training speech data, and the training embedded vector are processed by using the first encoder and the first decoder, to obtain the predicted target synthesized speech data. The first encoder and the first decoder are adjusted according to the difference between the predicted target synthesized speech data and the training speech data, to make the predicted target synthesized speech data continuously approximate to the training speech data, thereby obtaining the trained first encoder and first decoder. The training embedded vector generated according to the residual between the synthesized training speech data and the training speech data is used in the training process. The training embedded vector includes only a speech feature, and impact of a semantic feature on model training does not need to be considered, thereby reducing complexity of the first encoder and the first decoder, and improving accuracy of a training result.

Figure 18:
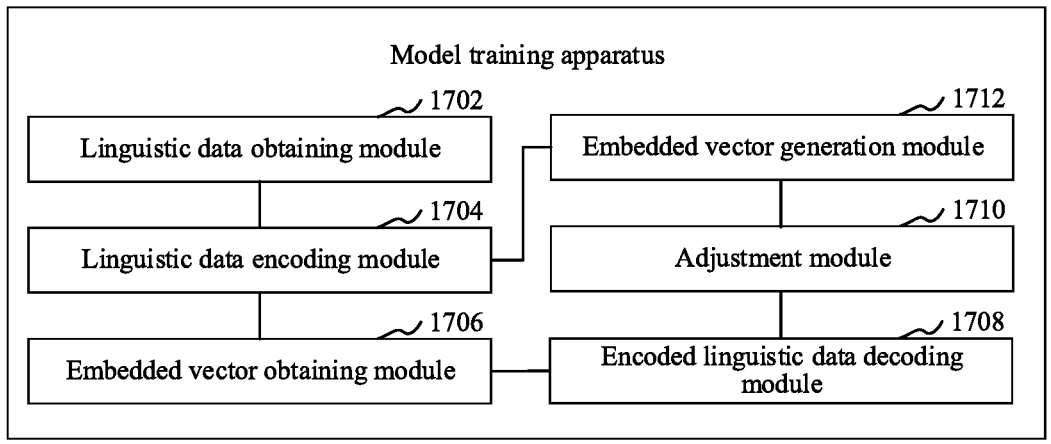
FIG. 18 is a structural block diagram of a model training apparatus according to another embodiment.

In an embodiment, as shown in FIG. 18, the apparatus further includes an embedded vector generation module 1712.

The linguistic data encoding module 1704 is further configured to encode the training linguistic data by using a second encoder, to obtain second encoded training linguistic data.

The encoded linguistic data decoding module 1708 is further configured to decode the second encoded training linguistic data by using a second decoder, to obtain synthesized training speech data.

The embedded vector generation module 1712 is configured to generate the training embedded vector according to a residual between the synthesized training speech data and the training speech data by using a residual model.

The adjustment module 1710 is further configured to adjust the second encoder, the second decoder, the residual model, the first encoder, and the first decoder according to the difference between the predicted target synthesized speech data and the training speech data, and continue to perform training until the training stop condition is satisfied.

In the foregoing embodiment, the second encoder, the second decoder, the residual model, the first encoder, and the first decoder are trained by using the training linguistic data and corresponding training speech data. The second encoder, the second decoder, the residual model, the first encoder, and the first decoder are adjusted according to the difference between the predicted target synthesized speech data and the training speech data, to make the predicted target synthesized speech data continuously approximate to the training speech data, thereby obtaining the trained second encoder, second decoder, residual model, first encoder, and first decoder.

In addition, the training embedded vector generated according to the residual between the synthesized training speech data and the training speech data is used in the training process. The training embedded vector includes only a speech feature, and impact of a semantic feature on model training does not need to be considered, thereby reducing complexity of the second encoder, the second decoder, the residual model, the first encoder, and the first decoder, and improving accuracy of a training result.

Finally, the second encoder, the second decoder, and the residual model that are configured to obtain the embedded vector used for representing the style feature are combined with the first encoder and the first decoder that are configured to synthesize a speech, thereby reducing a data requirement of the speech synthesis system, and improving accuracy of establishing the speech synthesis system.

Figure 19:
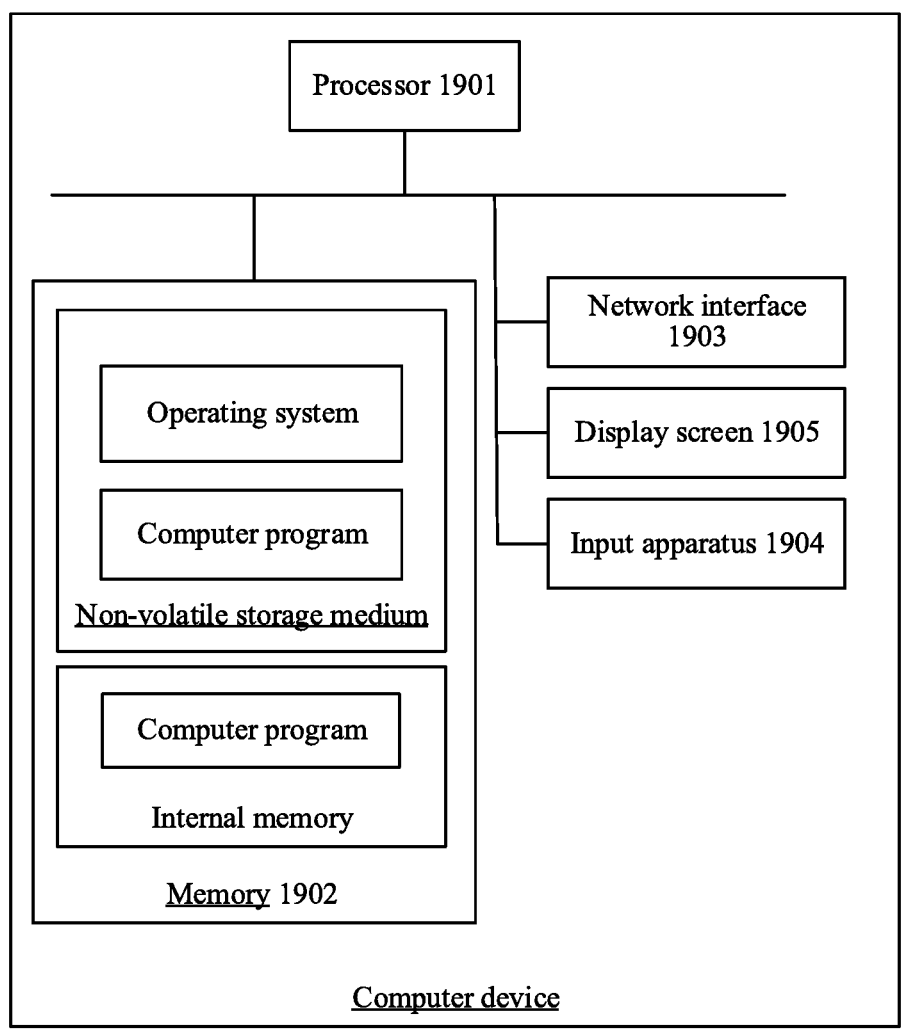
FIG. 19 is a structural block diagram of a computer device according to an embodiment.

FIG. 19 is a diagram of an internal structure of a computer device according to an embodiment. The computer device may be the terminal on which the speech synthesis system is run in FIG. 1. As shown in FIG. 19, the computer device includes a processor 1901, a memory 1902, a network interface 1903, an input apparatus 1904, and a display screen 1905 that are connected through a system bus. The memory 1902 includes a non-transitory storage medium and an internal memory. The non-transitory storage medium of the computer device stores an operating system, and may further store a computer program. The computer program, when executed by the processor 1901, may cause the processor 1901 to implement a speech synthesis method. The internal memory may also store a computer program. The computer program, when executed by the processor 1901, may cause the processor 1901 to perform the speech synthesis method. The display screen 1905 of the computer device may be a liquid crystal display screen or an electronic ink display screen. The input apparatus 1904 of the computer device may be a touch layer covering the display screen, or may be a key, a trackball, or a touchpad disposed on a housing of the computer device, or may be an external keyboard, touchpad, mouse, or the like.

A person skilled in the art may understand that, the structure shown in FIG. 19 is merely a block diagram of a partial structure related to the solution of this application, and does not limit the computer device to which the solution of this application is applied. The computer device may include more or fewer components than those shown in the figure, or some components may be combined, or a different component deployment may be used.

In an embodiment, the speech synthesis apparatus provided in this application may be implemented in a form of a computer program, and the computer program may be run on the computer device shown in FIG. 19. The memory 1902 of the computer device may store program modules forming the speech synthesis apparatus, for example, the linguistic data obtaining module 1502, the linguistic data encoding module 1504, the embedded vector obtaining module 1506, and the encoded linguistic data decoding module 1508 shown in FIG. 15. The computer program formed by the program modules causes the processor 1901 to perform the steps of the speech synthesis method in the embodiments of this application described in this specification.

For example, the computer device shown in FIG. 19 may perform S202 by using the linguistic data obtaining module 1502 in the speech synthesis apparatus shown in FIG. 15. The computer device may perform S204 by using the linguistic data encoding module 1504. The computer device may perform S206 by using the embedded vector obtaining module 1506. The computer device may perform S208 by using the encoded linguistic data decoding module 1508.

In an embodiment, a computer device is provided, including a memory and a processor, the memory storing a computer program, the computer program, when executed by the processor, causing the processor to perform the following steps: obtaining to-be-processed linguistic data; encoding the linguistic data, to obtain encoded linguistic data; obtaining an embedded vector for speech feature conversion, the embedded vector being generated according to a residual between synthesized reference speech data and reference speech data that correspond to the same reference linguistic data; and decoding the encoded linguistic data according to the embedded vector, to obtain target synthesized speech data on which the speech feature conversion is performed.

In an embodiment, the computer program, when executed by the processor, causes the processor to further perform the following steps: obtaining reference linguistic data and corresponding reference speech data; encoding the reference linguistic data, to obtain encoded reference linguistic data; decoding the encoded reference linguistic data, to obtain synthesized reference speech data; and determining an embedded vector for speech feature conversion according to a residual between the reference speech data and the synthesized reference speech data.

In an embodiment, the computer program, when executed by the processor to perform the step of determining an embedded vector for speech feature conversion according to a residual between the reference speech data and the synthesized reference speech data, causes the processor to perform the following steps: determining the residual between the reference speech data and the synthesized reference speech data; processing the residual by using a residual model; and generating the embedded vector for speech feature conversion according to a result of a forward operation and a result of a backward operation of the residual model.

In an embodiment, the computer program, when executed by the processor to perform the step of generating the embedded vector for speech feature conversion according to a result of a forward operation and a result of a backward operation of the residual model, causes the processor to perform the following steps: obtaining a first vector outputted in the last time step during the forward operation performed by a forward GRU layer of the residual model; obtaining a second vector outputted in the first time step during the backward operation performed by a backward GRU layer of the residual model; and superposing the first vector and the second vector, to obtain the embedded vector for speech feature conversion.

In an embodiment, the computer program, when executed by the processor to perform the step of processing the residual by using a residual model, causes the processor to perform the following step: processing the residual by using a dense layer, a forward GRU layer, and a backward GRIT layer of the residual model.

In an embodiment, the encoded linguistic data is obtained through encoding by using a first encoder, the target synthesized speech data is obtained through decoding by using a first decoder. The computer program, when executed by the processor, causes the processor to further perform the following steps: obtaining training linguistic data and corresponding training speech data; encoding the training linguistic data by using the first encoder, to obtain first encoded training linguistic data; obtaining a training embedded vector for speech feature conversion, the training embedded vector being generated according to a residual between synthesized training speech data and training speech data that correspond to the same training linguistic data; decoding the first encoded training linguistic data according to the training embedded vector by using the first decoder, to obtain predicted target synthesized speech data on which the speech feature conversion is performed; and adjusting the first encoder and the first decoder according to a difference between the predicted target synthesized speech data and the training speech data, and continuing to perform training until a training stop condition is satisfied.

In an embodiment, the encoded linguistic data is obtained through encoding by using a first encoder, the target synthesized speech data is obtained through decoding by using a first decoder, the encoded reference linguistic data is obtained through encoding by using a second encoder, the synthesized reference speech data is obtained through decoding by using a second decoder, and the embedded vector is obtained by using a residual model.

In an embodiment, the computer program, when executed by the processor, causes the processor to further perform the following steps: obtaining training linguistic data and corresponding training speech data; encoding the training linguistic data by using the second encoder, to obtain second encoded training linguistic data; decoding the second encoded training linguistic data by using the second decoder, to obtain synthesized training speech data; generating a training embedded vector according to a residual between the synthesized training speech data and the training speech data by using the residual model; decoding first encoded training linguistic data according to the training embedded vector by using the first decoder, to obtain predicted target synthesized speech data on which the speech feature conversion is performed; and adjusting the second encoder, the second decoder, the residual model, the first encoder, and the first decoder according to a difference between the predicted target synthesized speech data and the training speech data, and continuing to perform training until a training stop condition is satisfied.

In an embodiment, the computer program, when executed by the processor to perform the step of decoding the encoded linguistic data according to the embedded vector, to obtain target synthesized speech data on which the speech feature conversion is performed, causes the processor to perform the following steps: splicing the encoded linguistic data and the embedded vector to obtain a spliced vector; and decoding the spliced vector to obtain the target synthesized speech data on which the speech feature conversion is performed.

In an embodiment, the computer program, when executed by the processor, causes the processor to further perform the following steps: determining a speech amplitude spectrum corresponding to the target synthesized speech data; converting the speech amplitude spectrum into a speech waveform signal in a time domain; and generating a speech according to the speech waveform signal.

In an embodiment, a non-transitory computer-readable storage medium is provided, storing a computer program, the computer program, when executed by a processor, causing the processor to perform the following steps: obtaining to-be-processed linguistic data; encoding the linguistic data, to obtain encoded linguistic data; obtaining an embedded vector for speech feature conversion, the embedded vector being generated according to a residual between synthesized reference speech data and reference speech data that correspond to the same reference linguistic data; and decoding the encoded linguistic data according to the embedded vector, to obtain target synthesized speech data on which the speech feature conversion is performed.

In an embodiment, the computer program, when executed by the processor, causes the processor to further perform the following steps: obtaining reference linguistic data and corresponding reference speech data; encoding the reference linguistic data, to obtain encoded reference linguistic data; decoding the encoded reference linguistic data, to obtain synthesized reference speech data; and determining an embedded vector for speech feature conversion according to a residual between the reference speech data and the synthesized reference speech data.

In an embodiment, the computer program, when executed by the processor to perform the step of determining an embedded vector for speech feature conversion according to a residual between the reference speech data and the synthesized reference speech data, causes the processor to perform the following steps: determining the residual between the reference speech data and the synthesized reference speech data; processing the residual by using a residual model; and generating the embedded vector for speech feature conversion according to a result of a forward operation and a result of a backward operation of the residual model.

In an embodiment, the computer program, when executed by the processor to perform the step of generating the embedded vector for speech feature conversion according to a result of a forward operation and a result of a backward operation of the residual model, causes the processor to perform the following steps: obtaining a first vector outputted in the last time step during the forward operation performed by a forward GRU layer of the residual model; obtaining a second vector outputted in the first time step during the backward operation performed by a backward GRU layer of the residual model; and superposing the first vector and the second vector, to obtain the embedded vector for speech feature conversion.

In an embodiment, the computer program, when executed by the processor to perform the step of processing the residual by using a residual model, causes the processor to perform the following step: processing the residual by using a dense layer, a forward GRU layer, and a backward GRU layer of the residual model.

In an embodiment, the encoded linguistic data is obtained through encoding by using a first encoder, the target synthesized speech data is obtained through decoding by using a first decoder. The computer program, when executed by the processor, causes the processor to further perform the following steps: obtaining training linguistic data and corresponding training speech data; encoding the training linguistic data by using the first encoder, to obtain first encoded training linguistic data; obtaining a training embedded vector for speech feature conversion, the training embedded vector being generated according to a residual between synthesized training speech data and training speech data that correspond to the same training linguistic data; decoding the first encoded training linguistic data according to the training embedded vector by using the first decoder, to obtain predicted target synthesized speech data on which the speech feature conversion is performed; and adjusting the first encoder and the first decoder according to a difference between the predicted target synthesized speech data and the training speech data, and continuing to perform training until a training stop condition is satisfied.

In an embodiment, the encoded linguistic data is obtained through encoding by using a first encoder, the target synthesized speech data is obtained through decoding by using a first decoder, the encoded reference linguistic data is obtained through encoding by using a second encoder, the synthesized reference speech data is obtained through decoding by using a second decoder, and the embedded vector is obtained by using a residual model.

In an embodiment, the computer program, when executed by the processor, causes the processor to further perform the following steps: obtaining training linguistic data and corresponding training speech data; encoding the training linguistic data by using the second encoder, to obtain second encoded training linguistic data; decoding the second encoded training linguistic data by using the second decoder, to obtain synthesized training speech data; generating a training embedded vector according to a residual between the synthesized training speech data and the training speech data by using the residual model; decoding first encoded training linguistic data according to the training embedded vector by using the first decoder, to obtain predicted target synthesized speech data on which the speech feature conversion is performed; and adjusting the second encoder, the second decoder, the residual model, the first encoder, and the first decoder according to a difference between the predicted target synthesized speech data and the training speech data, and continuing to perform training until a training stop condition is satisfied.

In an embodiment, the computer program, when executed by the processor to perform the step of decoding the encoded linguistic data according to the embedded vector, to obtain target synthesized speech data on which the speech feature conversion is performed, causes the processor to perform the following steps: splicing the encoded linguistic data and the embedded vector to obtain a spliced vector; and decoding the spliced vector to obtain the target synthesized speech data on which the speech feature conversion is performed.

In an embodiment, the computer program, when executed by the processor, causes the processor to further perform the following steps: determining a speech amplitude spectrum corresponding to the target synthesized speech data; converting the speech amplitude spectrum into a speech waveform signal in a time domain; and generating a speech according to the speech waveform signal.

Figure 20:
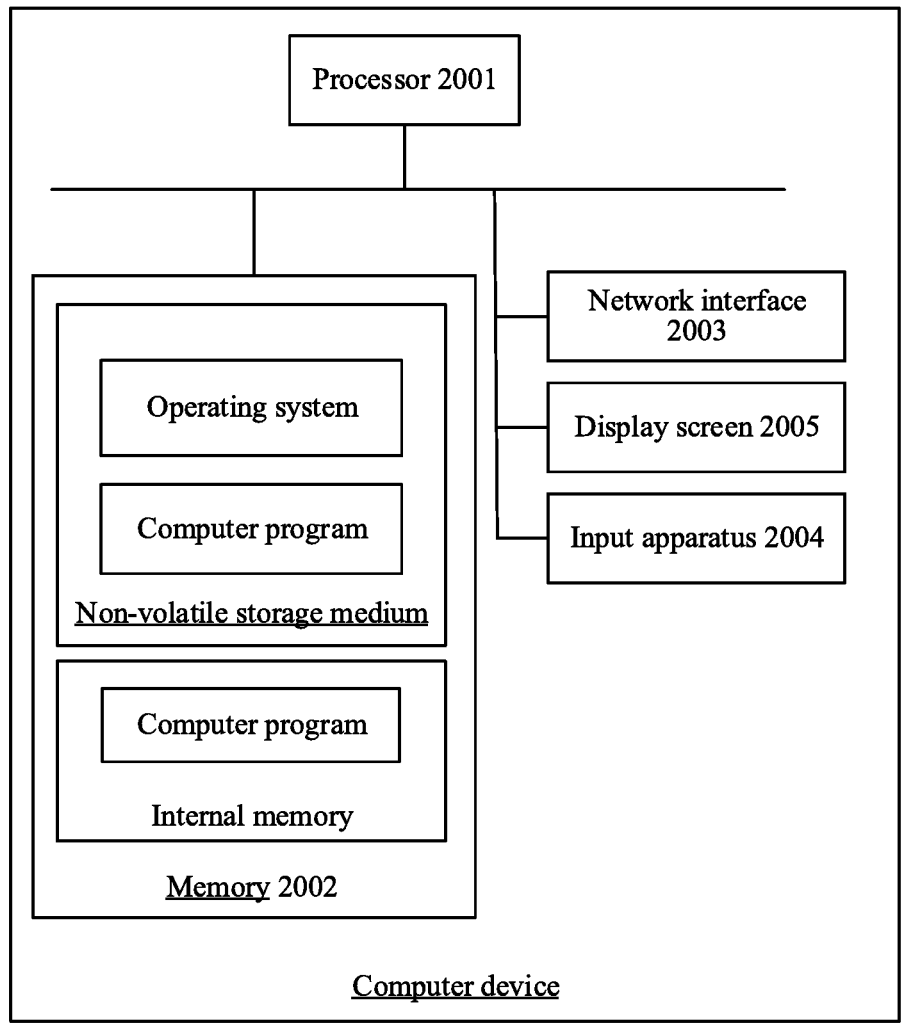
FIG. 20 is a structural block diagram of a computer device according to another embodiment.

FIG. 20 is a diagram of an internal structure of a computer device according to an embodiment. The computer device may be the terminal on which the model training system is run in FIG. 1. As shown in FIG. 20, the computer device includes a processor 2001, a memory 2002, a network interface 2003, an input apparatus 2004, and a display screen 2005 that are connected through a system bus. The memory 2002 includes a non-transitory storage medium and an internal memory. The non-transitory storage medium of the computer device stores an operating system, and may further store a computer program. The computer program, when executed by the processor 2001, may cause the processor 2001 to implement a model training method. The internal memory may also store a computer program. The computer program, when executed by the processor 2001, may cause the processor 2001 to perform the model training method. The display screen 2005 of the computer device may be a liquid crystal display screen or an electronic ink display screen. The input apparatus 2004 of the computer device may be a touch layer covering the display screen, or may be a key, a trackball, or a touchpad disposed on a housing of the computer device, or may be an external keyboard, touchpad, mouse, or the like.

A person skilled in the art may understand that, the structure shown in FIG. 20 is merely a block diagram of a partial structure related to the solution of this application, and does not limit the computer device to which the solution of this application is applied. The computer device may include more or fewer components than those shown in the figure, or some components may be combined, or a different component deployment may be used.

In an embodiment, the model training apparatus provided in this application may be implemented in a form of a computer program, and the computer program may be run on the computer device shown in FIG. 20. The memory 2002 of the computer device may store program modules forming the model training apparatus, for example, the speech data obtaining module 1702, the linguistic data encoding module 1704, the embedded vector obtaining module 1706, the encoded linguistic data decoding module 1708, and the adjustment module 1710 shown in FIG. 17. The computer program formed by the program modules causes the processor 2001 to perform the steps of the model training method in the embodiments of this application described in this specification.

For example, the computer device shown in FIG. 20 may perform S1302 by using the speech data obtaining module 1702 in the model training apparatus shown in FIG. 17, The computer device may perform S1304 by using the linguistic data encoding module 1704. The computer device may perform S1306 by using the embedded vector obtaining module 1706. The computer device may perform S1308 by using the encoded linguistic data decoding module 1708. The computer device may perform S1310 by using the adjustment module 1710.

In an embodiment, a computer device is provided, including a memory and a processor, the memory storing a computer program, the computer program, when executed by the processor, causing the processor to perform the following steps: obtaining training linguistic data and corresponding training speech data; encoding the training linguistic data by using a first encoder, to obtain first encoded training linguistic data; obtaining a training embedded vector for speech feature conversion, the training embedded vector being generated according to a residual between synthesized training speech data and training speech data that correspond to the same training linguistic data; decoding the first encoded training linguistic data according to the training embedded vector by using a first decoder, to obtain predicted target synthesized speech data on which the speech feature conversion is performed; and adjusting the first encoder and the first decoder according to a difference between the predicted target synthesized speech data and the training speech data, and continuing to perform training until a training stop condition is satisfied.

In an embodiment, the computer program, when executed by the processor, causes the processor to further perform the following steps: encoding the training linguistic data by using a second encoder, to obtain second encoded training linguistic data; decoding the second encoded training linguistic data by using a second decoder, to obtain synthesized training speech data; and generating the training embedded vector according to a residual between the synthesized training speech data and the training speech data by using a residual model. The computer program, when executed by the processor to perform the step of adjusting the first encoder and the first decoder according to a difference between the predicted target synthesized speech data and the training speech data, and continuing to perform training until a training stop condition is satisfied, causes the processor to perform the following step: adjusting the second encoder, the second decoder, the residual model, the first encoder, and the first decoder according to the difference between the predicted target synthesized speech data and the training speech data, and continuing to perform training until the training stop condition is satisfied.

In an embodiment, a non-transitory computer-readable storage medium is provided, storing a computer program, the computer program, when executed by a processor, causing the processor to perform the following steps: obtaining training linguistic data and corresponding training speech data; encoding the training linguistic data by using a first encoder, to obtain first encoded training linguistic data; obtaining a training embedded vector for speech feature conversion, the training embedded vector being generated according to a residual between synthesized training speech data and training speech data that correspond to the same training linguistic data; decoding the first encoded training linguistic data according to the training embedded vector by using a first decoder, to obtain predicted target synthesized speech data on which the speech feature conversion is performed; and adjusting the first encoder and the first decoder according to a difference between the predicted target synthesized speech data and the training speech data, and continuing to perform training until a training stop condition is satisfied.

In an embodiment, the computer program, when executed by the processor, causes the processor to further perform the following steps: encoding the training linguistic data by using a second encoder, to obtain second encoded training linguistic data; decoding the second encoded training linguistic data by using a second decoder, to obtain synthesized training speech data; and generating the training embedded vector according to a residual between the synthesized training speech data and the training speech data by using a residual model. The computer program, when executed by the processor to perform the step of adjusting the first encoder and the first decoder according to a difference between the predicted target synthesized speech data and the training speech data, and continuing to perform training until a training stop condition is satisfied, causes the processor to perform the following step: adjusting the second encoder, the second decoder, the residual model, the first encoder, and the first decoder according to the difference between the predicted target synthesized speech data and the training speech data, and continuing to perform training until the training stop condition is satisfied.

A person of ordinary skill in the art may understand that all or some of the processes in the method of the foregoing embodiments may be implemented by a computer program instructing related hardware. The program may be stored in a non-transitory computer-readable storage medium, and the program, when executed, may include the processes of the foregoing method embodiments. Any reference to a memory, storage, database or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration rather than limitation, the RAM is available in a plurality of forms, such as a static RAM (SRAM), a dynamic RAM (DRAM), a synchronous DRAM (SDRAM), a dual data rate SDRAM (DDRS-DRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), and a memory bus dynamic RAM (RDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments show only several implementations of this application, and descriptions thereof are in detail, but shall not be understood as limiting the patent scope of this application. A person of ordinary skill in the art may make various changes and improvements without departing from the ideas of this application, which shall all fall within the protection scope of this application. Therefore, the patent protection scope of this application shall be subject to the appended claims.

What is claimed is:

1. A speech synthesis method performed at a computer device having one or more processors and memory storing one or more programs to be executed by the one or more processors, the method comprising:
    obtaining linguistic data;
    encoding the linguistic data, to obtain encoded linguistic data;
    obtaining reference linguistic data and corresponding target reference speech data;
    encoding the reference linguistic data, to obtain encoded reference linguistic data;
    decoding the encoded reference linguistic data, to obtain synthesized reference speech data;
    determining a residual between the target reference speech data and the synthesized reference speech data;
    obtaining an embedded vector for speech feature conversion, the embedded vector representing a speaking style feature of a target user and being generated according to the residual between the synthesized reference speech data synthesized from the reference linguistic data different from the linguistic data and the target reference speech data that correspond to the same reference linguistic data; and
    decoding the encoded linguistic data by performing the speech feature conversion on the encoded linguistic data according to the embedded vector, to obtain target synthesized speech data corresponding to the linguistic data.

2. The method according to claim 1, further comprising:
    processing the residual by using a residual model; and
    generating the embedded vector for speech feature conversion according to a result of a forward operation and a result of a backward operation of the residual model.

3. The method according to claim 2, wherein the generating the embedded vector for speech feature conversion according to a result of a forward operation and a result of a backward operation of the residual model comprises:
    obtaining a first vector outputted in the last time step during the forward operation performed by a forward gated recurrent unit (GRU) layer of the residual model;
    obtaining a second vector outputted in the first time step during the backward operation performed by a backward GRU layer of the residual model; and
    superposing the first vector and the second vector, to obtain the embedded vector for speech feature conversion.

4. The method according to claim 2, wherein the processing the residual by using a residual model comprises:
    processing the residual by using a dense layer, a forward gated recurrent unit (GRU) layer, and a backward GRU layer of the residual model.

5. The method according to claim 2, wherein the encoded linguistic data is encoded by using a first encoder, the target synthesized speech data is decoded by using a first decoder, the encoded reference linguistic data is encoded by using a second encoder, the synthesized reference speech data is decoded by using a second decoder, and the embedded vector is obtained by using the residual model.

6. The method according to claim 5, further comprising:
    obtaining training linguistic data and corresponding training speech data;
    encoding the training linguistic data by using the second encoder, to obtain second encoded training linguistic data;
    decoding the second encoded training linguistic data by using the second decoder, to obtain synthesized training speech data;
    generating a training embedded vector according to a residual between the synthesized training speech data and the training speech data by using the residual model;
    decoding first encoded training linguistic data according to the training embedded vector, to obtain predicted target synthesized speech data on which the speech feature conversion is performed; and
    adjusting the second encoder, the second decoder, the residual model, the first encoder, and the first decoder according to a difference between the predicted target synthesized speech data and the training speech data, and continuing to perform training until a training stop condition is satisfied.

7. The method according to claim 1, wherein the encoded linguistic data is encoded by using a first encoder, the target synthesized speech data is decoded by using a first decoder, and the method further comprises:
obtaining training linguistic data and corresponding target training speech data;
encoding the training linguistic data by using the first encoder, to obtain first encoded training linguistic data;
obtaining a training embedded vector for speech feature conversion, the training embedded vector being generated according to a residual between training speech data synthesized from the training linguistic data and the target training speech data that correspond to the same training linguistic data;
decoding the first encoded training linguistic data according to the training embedded vector by using the first decoder, to obtain predicted target synthesized speech data on which the speech feature conversion is performed; and
adjusting the first encoder and the first decoder according to a difference between the predicted target synthesized speech data and the target training speech data until a training stop condition is satisfied.

8. The method according to claim 1, wherein the decoding the encoded linguistic data by performing the speech feature conversion on the encoded linguistic data according to the embedded vector, to obtain target synthesized speech data comprises:
splicing the encoded linguistic data and the embedded vector to obtain a spliced vector; and
decoding the spliced vector to obtain the target synthesized speech data on which the speech feature conversion is performed.

9. The method according to claim 1, further comprising:
determining a speech amplitude spectrum corresponding to the target synthesized speech data;
converting the speech amplitude spectrum into a speech waveform signal in a time domain; and
generating a speech according to the speech waveform signal.

10. A computer device, comprising a memory and a processor, the memory storing a plurality of computer programs, the computer programs, when executed by the processor, causing the computer device to perform a plurality of operations including:
obtaining linguistic data;
encoding the linguistic data, to obtain encoded linguistic data;
obtaining reference linguistic data and corresponding target reference speech data;
encoding the reference linguistic data, to obtain encoded reference linguistic data;
decoding the encoded reference linguistic data, to obtain synthesized reference speech data;
determining a residual between the target reference speech data and the synthesized reference speech data;
obtaining an embedded vector for speech feature conversion, the embedded vector representing a speaking style feature of a target user and being generated according to the residual between the synthesized reference speech data synthesized from reference linguistic data different from the linguistic data and the target reference speech data that correspond to the same reference linguistic data; and
decoding the encoded linguistic data by performing the speech feature conversion on the encoded linguistic data according to the embedded vector, to obtain target synthesized speech data corresponding to the linguistic data.

11. The computer device according to claim 10, wherein the plurality of operations further comprise:
processing the residual by using a residual model; and
generating the embedded vector for speech feature conversion according to a result of a forward operation and a result of a backward operation of the residual model.

12. The computer device according to claim 11, wherein the generating the embedded vector for speech feature conversion according to a result of a forward operation and a result of a backward operation of the residual model comprises:
obtaining a first vector outputted in the last time step during the forward operation performed by a forward gated recurrent unit (GRU) layer of the residual model;
obtaining a second vector outputted in the first time step during the backward operation performed by a backward GRU layer of the residual model; and
superposing the first vector and the second vector, to obtain the embedded vector for speech feature conversion.

13. The computer device according to claim 11, wherein the processing the residual by using a residual model comprises:
processing the residual by using a dense layer, a forward gated recurrent unit (GRU) layer, and a backward GRU layer of the residual model.

14. The computer device according to claim 11, wherein the encoded linguistic data is encoded by using a first encoder, the target synthesized speech data is decoded by using a first decoder, the encoded reference linguistic data is encoded by using a second encoder, the synthesized reference speech data is decoded by using a second decoder, and the embedded vector is obtained by using the residual model.

15. The computer device according to claim 10, wherein the encoded linguistic data is encoded by using a first encoder, the target synthesized speech data is decoded by using a first decoder, and the computer programs, when executed by the processor, further causing the computer device to perform a plurality of operations including:
obtaining training linguistic data and corresponding target training speech data;
encoding the training linguistic data by using the first encoder, to obtain first encoded training linguistic data;
obtaining a training embedded vector for speech feature conversion, the training embedded vector being generated according to a residual between training speech data synthesized from the training linguistic data and the target training speech data that correspond to the same training linguistic data;
decoding the first encoded training linguistic data according to the training embedded vector by using the first decoder, to obtain predicted target synthesized speech data on which the speech feature conversion is performed; and
adjusting the first encoder and the first decoder according to a difference between the predicted target synthesized speech data and the target training speech data until a training stop condition is satisfied.

16. The computer device according to claim 10, wherein the decoding the encoded linguistic data by performing the speech feature conversion on the encoded linguistic data according to the embedded vector, to obtain target synthesized speech data comprises:
- splicing the encoded linguistic data and the embedded vector to obtain a spliced vector; and
- decoding the spliced vector to obtain the target synthesized speech data on which the speech feature conversion is performed.

17. The computer device according to claim 10, wherein the plurality of operations further comprise:
- determining a speech amplitude spectrum corresponding to the target synthesized speech data;
- converting the speech amplitude spectrum into a speech waveform signal in a time domain; and
- generating a speech according to the speech waveform signal.

18. A non-transitory computer-readable storage medium, storing a plurality of computer programs, the computer programs, when executed by a processor of a computer device, causing the computer device to perform a plurality of operations including:
- obtaining linguistic data;
- encoding the linguistic data, to obtain encoded linguistic data;
- obtaining reference linguistic data and corresponding target reference speech data;
- encoding the reference linguistic data, to obtain encoded reference linguistic data;
- decoding the encoded reference linguistic data, to obtain synthesized reference speech data;
- determining a residual between the target reference speech data and the synthesized reference speech data;
- obtaining an embedded vector for speech feature conversion, the embedded vector representing a speaking style feature of a target user and being generated according to the residual between the synthesized reference speech data synthesized from reference linguistic data different from the linguistic data and the target reference speech data that correspond to the same reference linguistic data; and
- decoding the encoded linguistic data by performing the speech feature conversion on the encoded linguistic data according to the embedded vector, to obtain target synthesized speech data corresponding to the linguistic data.

* * * * *